(12) United States Patent
Verdejo et al.

(10) Patent No.: US 10,839,296 B2
(45) Date of Patent: Nov. 17, 2020

(54) AUTOMATIC PREDICTION OF AN EVENT USING DATA

(71) Applicant: Accenture Global Solutions Limited, Dublin (IE)

(72) Inventors: Dominique Verdejo, Dublin (IE); Freddy Lecue, Dublin (IE); Md Faisal Zaman, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 633 days.

(21) Appl. No.: 15/365,362

(22) Filed: Nov. 30, 2016

(65) Prior Publication Data

US 2018/0150750 A1 May 31, 2018

(51) Int. Cl.
| | | |
|---|---|---|
| *G06N 5/02* | (2006.01) | |
| *G06K 9/00* | (2006.01) | |
| *G06K 9/62* | (2006.01) | |
| *G06F 9/54* | (2006.01) | |
| *G06N 3/00* | (2006.01) | |
| *G06N 7/00* | (2006.01) | |

(52) U.S. Cl.
CPC ............ *G06N 5/02* (2013.01); *G06F 9/542* (2013.01); *G06K 9/00771* (2013.01); *G06K 9/6296* (2013.01); *G06N 5/022* (2013.01); *G06N 3/006* (2013.01); *G06N 7/005* (2013.01)

(58) Field of Classification Search
CPC ...... G06N 5/02; G06F 9/542; G06K 9/00771; G06K 9/6296
See application file for complete search history.

(56) References Cited

U.S. PATENT DOCUMENTS

2007/0025593 A1 2/2007 Haupt et al.
2013/0027561 A1 1/2013 Lee et al.
(Continued)

FOREIGN PATENT DOCUMENTS

EP   3 012 813 A2   4/2016

OTHER PUBLICATIONS

Aral, Sinan, Lev Muchnik, and Arun Sundararajan. "Distinguishing influence-based contagion from homophily-driven diffusion in dynamic networks." Proceedings of the National Academy of Sciences 106.51 (2009): 21544-21549. (Year: 2009).*

(Continued)

*Primary Examiner* — Ann J Lo
*Assistant Examiner* — Van C Mang
(74) *Attorney, Agent, or Firm* — Harrity & Harrity, LLP

(57) ABSTRACT

A device may receive data associated with an event. The device may identify a context of the event based on receiving the data. The device may identify a similar event based on performing a comparison of the context of the event and a context of the similar event. The device may determine a set of pre-events associated with the event based on identifying a pre-event that occurred before the similar event. The set of pre-events may include at least one pre-event similar to the pre-event that occurred before the similar event. The device may determine a set of post-events associated with the event based on determining the set of pre-events and identifying a post-event that occurred after the similar event. The set of post-events may include at least one post-event similar to the post-event. The device may perform an action based on the set of post-events.

20 Claims, 9 Drawing Sheets

(56) References Cited

U.S. PATENT DOCUMENTS

| | | | |
|---|---|---|---|
| 2013/0030875 A1 | 1/2013 | Lee et al. | |
| 2013/0325787 A1 | 12/2013 | Gerken et al. | |
| 2016/0019460 A1* | 1/2016 | Li | G06F 16/24578 719/318 |
| 2016/0027044 A1* | 1/2016 | Sharifi | G06Q 30/0251 705/14.49 |
| 2016/0027278 A1 | 1/2016 | McIntosh et al. | |
| 2016/0239756 A1 | 8/2016 | Aggour et al. | |
| 2016/0352583 A1* | 12/2016 | Chappell | G06Q 50/01 |
| 2018/0129733 A1* | 5/2018 | Chandrasekaran | G06F 16/3344 |
| 2019/0038216 A1* | 2/2019 | Ser | A61B 5/4818 |

OTHER PUBLICATIONS

Nikolic, "Measuring Similarity of Graph Nodes by Neighbor Matching", 2010 (Year: 2010).*

Sinan Aral, "Distinguishing influence-based contagion from homophily-driven diffusion in dynamic networks", 2009 (Year: 2009).*

Kooij et al., "Context-based pedestrian path prediction", European Conference on Computer Vision (ECCV) 2014, pp. 618-633, http://fcv2011.ulsan.ac.kr/files/announcement/483/Context-Based%20Pedestrian%20Path%20Prediction-eccv14.pdf.

Golembewski et al., "Efficient communication for large-scale robust image processing with smart camera devices", Computational Intelligence for Security and Defense Applications (CISDA), 2012, IEEE, Jul. 11, 2012, XP032229501.

Partial EP Search Report corresponding to EP 17201780, dated Apr. 13, 2018, 12 pages.

Extended European Search Report for Application No. EP17201780, dated Jul. 23, 2018, 10 pages.

UCLA, "R Data Analysis Examples: Canonical Correlation Analysis," http://www.ats.ucla.edu/stat/r/dae/canonical.htm, Jun. 1, 2007, 7 pages.

Wikipedia, "Canonical correlation," https://en.wikipedia.org/wiki/Canonical_correlation, Nov. 26, 2016, 5 pages.

* cited by examiner

AUTOMATIC PREDICTION OF AN EVENT USING DATA

BACKGROUND

Surveillance is the monitoring of the behavior, activities, or other changing information, usually of people for the purpose of influencing, managing, directing, or protecting the people. Surveillance can include observation from a distance using electronic equipment, such as video cameras, closed circuit television (CCTV) cameras, microphones, and/or the like. Surveillance may be used by governments for intelligence gathering, the prevention of crime, and/or the investigation of a crime. Surveillance also may be used for the protection of a process, a person, a group, an object, or the like.

SUMMARY

According to some possible implementations, a device may include one or more processors to receive data associated with a first event. The one or more processors may identify a first context of the first event based on the data. The one or more processors may identify a plurality of second events based on the first context and a second context of the plurality of second events. The first context may be similar to the second context. The one or more processors may determine a set of pre-events associated with the first event based on a plurality of pre-events associated with the plurality of second events. One or more pre-events of the set of pre-events may be similar to the plurality of pre-events. The one or more processors may determine a set of post-events associated with the first event based on the set of pre-events and based on a plurality of post-events associated with the plurality of second events. The set of post-events may include one or more post-events predicted to occur after the first event. The one or more post-events may be similar to the plurality of post-events. The one or more processors may perform an action related to the first event based on determining the set of post-events.

According to some possible implementations, a method may include receiving, by a device, data associated with an event. The method may include identifying, by the device, a context of the event based on receiving the data. The method may include identifying, by the device, a similar event based on performing a comparison of the context of the event and a context of the similar event. The method may include determining, by the device, a set of pre-events associated with the event based on identifying a pre-event that occurred before the similar event. The set of pre-events may include at least one pre-event similar to the pre-event that occurred before the similar event. The method may include determining, by the device, a set of post-events associated with the event based on determining the set of pre-events and identifying a post-event that occurred after the similar event. The set of post-events may include at least one post-event similar to the post-event. The method may include performing, by the device, an action based on the set of post-events.

According to some possible implementations, a non-transitory computer-readable medium may store one or more instructions that, when executed by one or more processors, cause the one or more processors to receive, from multiple devices, data associated with an event. The one or more instructions, when executed by the one or more processors may cause the one or more processors to process the data to identify a context of the event. The context of the event may be based on a term or a tag identified in the data. The one or more instructions, when executed by the one or more processors, may cause the one or more processors to identify a historical event associated with a similar context as the context of the event based on processing the data. The context of the historical event may be based on another term similar to the term or another tag similar to the tag. The one or more instructions, when executed by the one or more processors, may cause the one or more processors to determine a set of pre-events associated with the event based on identifying a pre-event associated with the historical event. The set of pre-events may be semantically similar to the pre-event. The one or more instructions, when executed by the one or more processors, may cause the one or more processors to determine a set of post-events associated with the event based on the set of pre-events and based on a post-event associated with the historical event. The set of post-events may be semantically similar to the post-event. The one or more instructions, when executed by the one or more processors, may cause the one or more processors to perform an action related to the event based on determining the set of post-events.

DETAILED DESCRIPTION

The following detailed description of example implementations refers to the accompanying drawings. The same reference numbers in different drawings may identify the same or similar elements.

A surveillance system (e.g., a surveillance system) may be used to perform video, image, and/or audio surveillance of a premises (e.g., a home, an airport, or the like) in order to detect an event, such as criminal activity and/or any other type of event. As such, a surveillance system may be used to perform surveillance in real-time or near real-time and/or to record video, an image, and/or audio for review at a later time. However, the surveillance system may lack a technique to predict an outcome of an observed or detected event, recommend an action to be performed based on the observed or detected event, and/or perform the recommended action.

Implementations described herein enable an analytics system to automatically identify a pre-event and/or a post-event of a historical event captured by a surveillance system, store information associated with the pre-event, the post-event, and/or the historical event, use the stored information to determine a pre-event and/or predict a post-event of a current event captured by the surveillance system, and/or perform an action based on determining the pre-event and/or predicting the post-event of the current event. In addition, implementations may enable determination of a pre-event that contributed to a predicted post-event (e.g., by determining that identification of a particular pre-event caused the analytics system to predict a particular post-event). In this way, the analytics system improves surveillance via determination of a pre-event and/or prediction of a post-event associated with a current event and facilitates performing an action based on the current event. In addition, the analytics system increases an efficiency of determining a pre-event and/or predicting a post-event by enabling automatic real-time or near real-time prediction. Further, the analytics system improves an accuracy of determining a pre-event and/or predicting a post-event of a current event, thereby conserving processing resources associated with inaccurately determining the pre-event and/or predicting the post-event. Further still, the analytics system improves safety by enabling quick and efficient performance of an action based on a current event, such as a criminal event. Further still, the analytics system may objectively determine a pre-event and/or predict a post-event associated with an event, thereby reducing or eliminating errors that would occur due to subjective human analysis.

FIGS. 1A-1E are diagrams of an overview of an example implementation 100 described herein. As shown in FIGS. 1A-1E, example implementation 100 includes a user device, a surveillance system, a server device, an analytics system, and a client device.

Figure 1A:
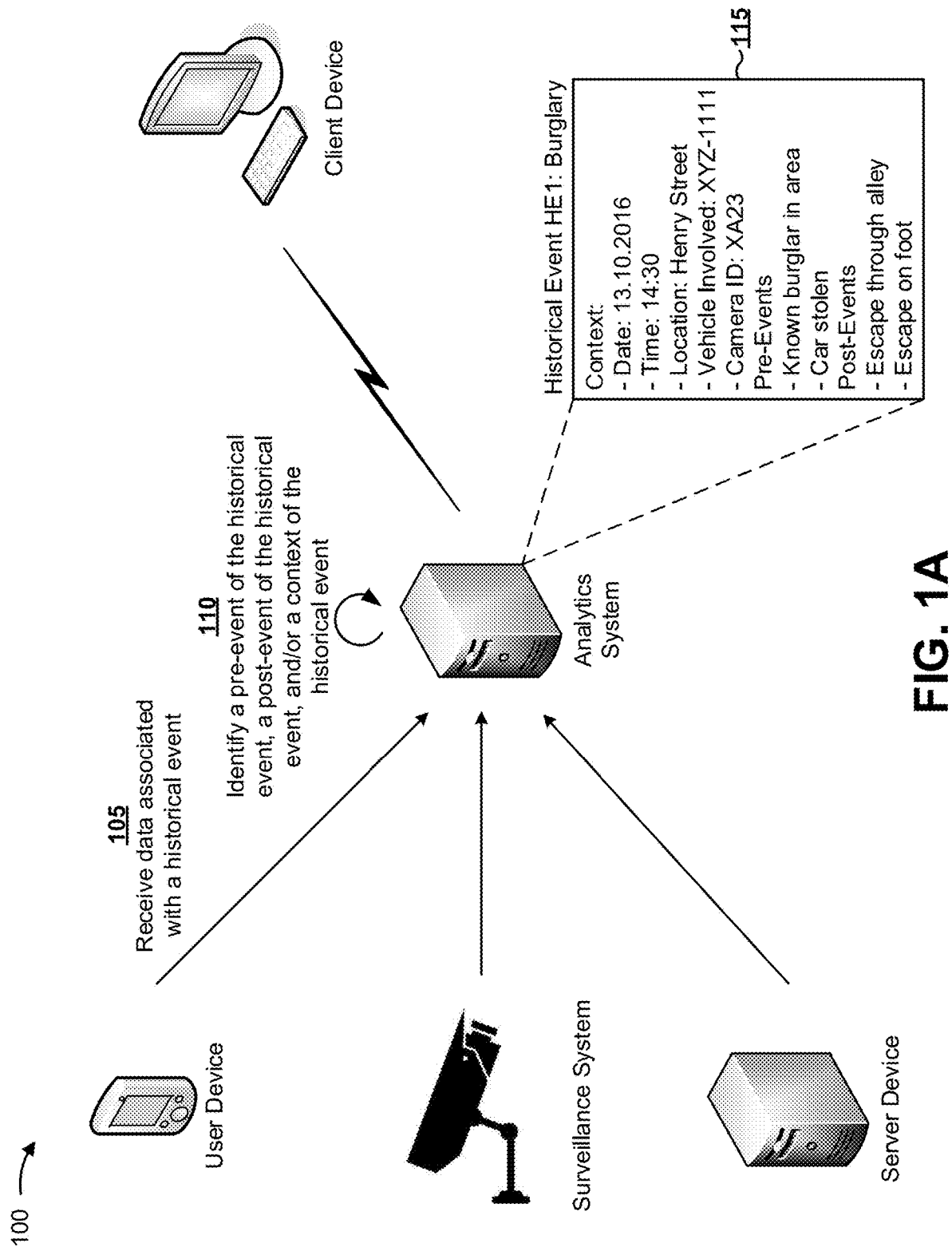
FIGS. 1A-1E are diagrams of an overview of an example implementation described herein.

As shown in FIG. 1A, and by reference number 105, the analytics system may receive data associated with a historical event. The analytics system may receive millions, billions, or trillions of data items associated with thousands, millions, or billions of historical events. The analytics system may receive the data from multiple sources and/or receive different types of data. For example, the analytics system may receive a text and/or an email message from the user device, a media item from the surveillance system (e.g., an image and/or audio and metadata related to the image and/or audio), a crime report from the server device, and/or the like. Continuing with the previous example, the analytics system may receive thousands, millions, or billions of text messages, emails, images, and/or audio files.

As shown by reference number 110, the analytics system may identify a pre-event of the historical event, a post-event of the historical event, and/or a context of the historical event using the received data. For example, the analytics system may identify thousands, millions, or billions of pre-events, post-events, and/or contexts associated with thousands, millions, or billions of historical events. A pre-event may include an event that occurs before the historical event, a post-event may include an event that occurs after the historical event, and the context of the historical event may include a location where the historical event occurred, a device identifier for a device that provided the data associated with the historical event, a time of day or day of the week when the historical event occurred, a classification of the historical event, and/or the like.

The analytics system may identify the pre-event, the post-event, and/or the context of the historical event by analyzing the data (e.g., performing a semantic analysis to identify a particular term and/or tag included in the data and/or performing image processing to identify a particular object, or type of object, in an image). For example, the analytics system may analyze thousands, millions, or billions of data items to identify thousands, millions, or billions of pre-events, post-events, and/or contexts associated with thousands, millions, or billions of historical events.

Assume, for example, that the historical event is historical event HE1 and that historical event HE1 is a burglary event. As shown by reference number 115, the analytics system may identify that the context of historical event HE1 includes a date of occurrence of Oct. 13, 2016, a time of occurrence of 14:30 hours, a location of occurrence of Henry Street, involvement of a vehicle having a vehicle identifier of XYZ-1111, and that the event was captured by a camera (e.g., of the surveillance system) having a camera identifier of XA23.

As further shown by reference number 115, the analytics system may identify that the pre-events of historical event HE1 include a known burglar reported or detected in the same geographic area as historical event HE1 (e.g., by processing a crime report, using facial recognition software to analyze an image captured prior to historical event HE1, and/or using voice recognition software to analyze audio data captured prior to historical event HE1), possibly indicating that the known burglar was scouting the area, and a report of stolen car in the same geographic area of historical event HE1. As further shown by reference number 115, the analytics system may identify that the post-events of historical event HE1 include a report that a burglar escaped through an alley near where historical event HE1 occurred and that the burglar escaped on foot (e.g., based on processing a crime report or a text message received from a user device).

Figure 1B:
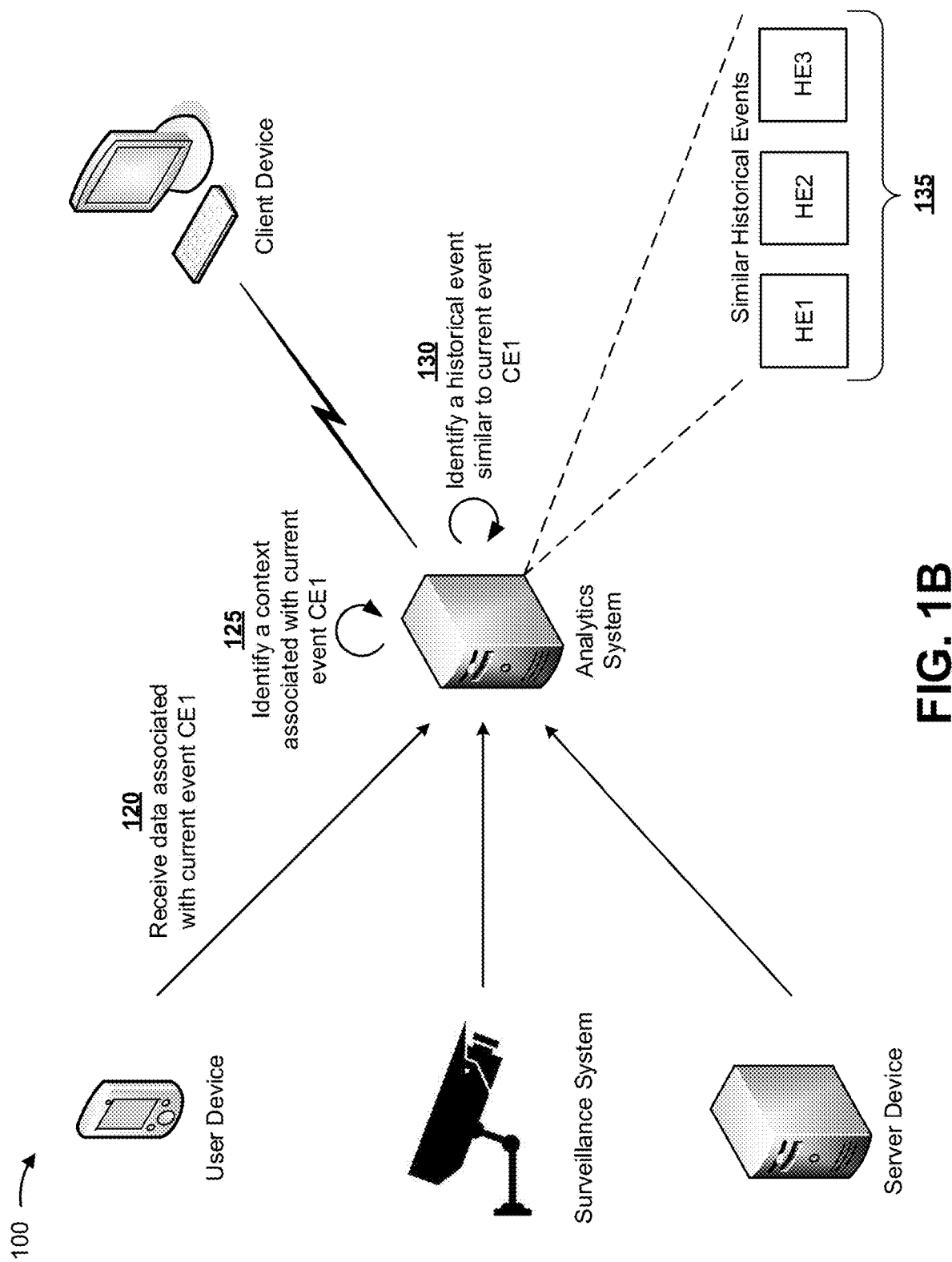

As shown in FIG. 1B, and by reference number 120, the analytics system may receive data associated with a current event (e.g., current event CE1). The analytics system may receive the data from the user device, from the surveillance system, and/or from the server device. The analytics system may receive data similar to what was described above. In addition, the analytics system may receive the data in real-time, near real-time, as current event C1 is occurring or unfolding, and/or the like.

As shown by reference number 125, the analytics system may identify a context associated with current event CE1 in a manner similar to that described above with respect to identifying the context of historical event HE1. As shown by reference number 130, the analytics system may identify a historical event similar to current event CE1 based on the context of current event CE1 and the context of the historical event (e.g., a historical event having a location similar to the location of current event CE1, a historical event that occurred at a time of day similar to current event CE1, or a historical event where an image related to the historical event shows a similar object as an image related to current event CE1). For example, the analytics system may use machine learning, modeling, artificial intelligence, semantic analysis, and/or the like to process thousands, millions, or billions of data items to identify a historical event, or thousands, millions, or billions of historical events, associated with current event CE1.

As shown by reference number 135, assume, for example, that the similar historical events identified by the analytics system include historical events HE1, HE2, and HE3 based on historical events HE1, HE2, and HE3 having a similar context to current event CE1. For example, the analytics system may analyze thousands, millions, or billions of data items to determine that historical events HE1, HE2 and HE3 have a similar context to current event CE1. In addition, although this example includes identification of three historical events (e.g., historical events HE1, HE2, and HE3), the analytics system may identify thousands, millions, or billions of historical events that have a context similar to current event CE1.

Figure 1C:
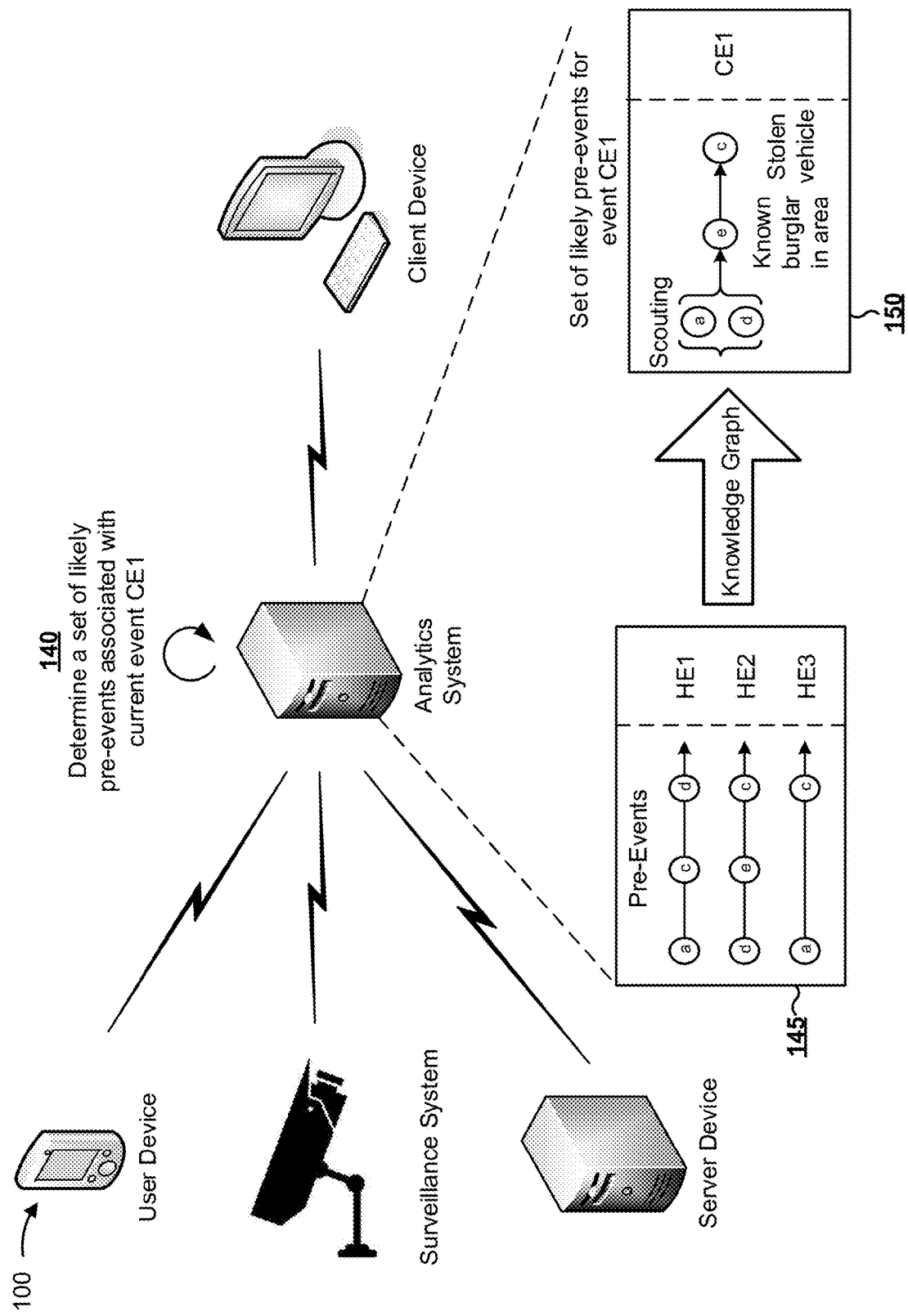

As shown in FIG. 1C, and by reference number 140, the analytics system may determine a set of pre-events associated with current event CE1. The identification of the set of pre-events may be based on identified pre-events of the similar historical events (e.g., historical events HE1, HE2, and HE3) using a knowledge graph. For example, and as shown by reference number 145, the analytics system may identify pre-events a, c, and d for historical event HE1, pre-events d, e, and c for historical event HE2, and pre-events a and c for historical event HE3.

As further shown by reference number 145, the analytics system may normalize the pre-events related to historical events HE1, HE2, and HE3, such as to determine an order of the pre-events across the historical events. For example, the analytics system may determine that pre-events a and d tend to occur a greater amount of time before a historical event than pre-events e and c, and may determine that pre-events a and d are to be ordered before pre-events e and c. In a similar manner, the analytics system may determine that pre-event e is to be ordered before pre-event c.

As further shown by reference number 145, the analytics system may map data for the pre-events associated with historical events HE1, HE2, and HE3 to the knowledge graph to structure data related to the pre-events into groups based on semantic similarities of the data related to the pre-events. For example, the analytics system may map the data for the pre-events to the knowledge graph to group the data for the pre-event by type of pre-event, by a term included in data for various pre-events, and/or the like. Continuing with the previous example, the analytics system may organize the data related the pre-events into groups, such as a scouting event, a known burglar in an area event, and/or a stolen vehicle event.

As shown by reference number 150, the analytics system may use these groups to determine the set of pre-events for current event CE1. For example, the set of pre-events may include a scouting event that relates to pre-events a and d, a known burglar in an area event related to pre-event e, and a stolen vehicle event related to pre-event c.

Figure 1D:
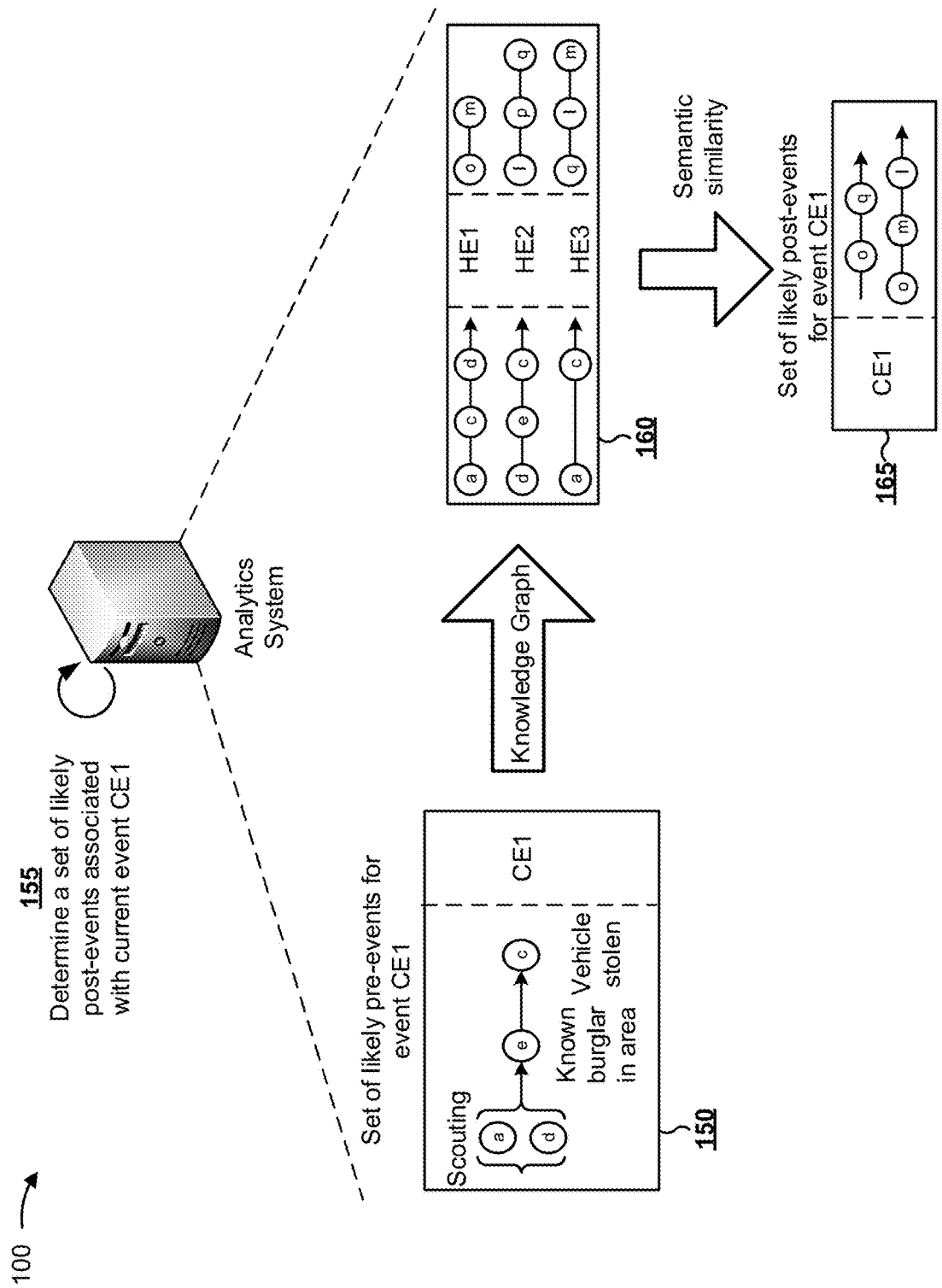

As shown in FIG. 1D, and by reference number 155, the analytics system may determine a set of post-events associated with current event CE1 using the set of pre-events for current event CE1 shown by reference number 150. The analytics system may map the set of pre-events for current event CE1 to the knowledge graph to identify the set of post-events for current event CE1.

As shown by reference number 160, the analytics system may identify historical events that have similar pre-events as the set of pre-events. For example, assume that the analytics system identifies historical events HE1, HE2, and HE3 as having pre-events similar to the set of pre-events. As further shown by reference number 160, the analytics system may identify post-events of the identified historical events. For example, the analytics system may identify that historical event HE1 is associated with post-events o and m, that historical event HE2 is associated with post-events l, p, and q, and that historical event HE3 is associated with post-events q, l, and m.

As shown by reference number 165, the analytics system may identify a set of post-events based on the post-events of historical events HE1, HE2, and HE3. For example, the analytics system may perform a semantic analysis of data related to the post-events of historical events HE1, HE2, HE3 to identify semantically similar post-events among historical events HE1, HE2, and HE3 and determine the set of post-events based on the post-events that have semantically similar data. As further shown by reference number 165, the analytics system may determine that the set of post-events includes post-event o followed by post-event q and/or that the set of post-events includes post-event o followed by post-event m, which may be followed by post-event 1. In some implementations, the analytics system may determine a likelihood of the set of post-events occurring (e.g., based on a frequency of occurrence with historical events HE1, HE2, HE3, based on a term associated with the post-events included in the set of post-events, etc.).

Figure 1E:
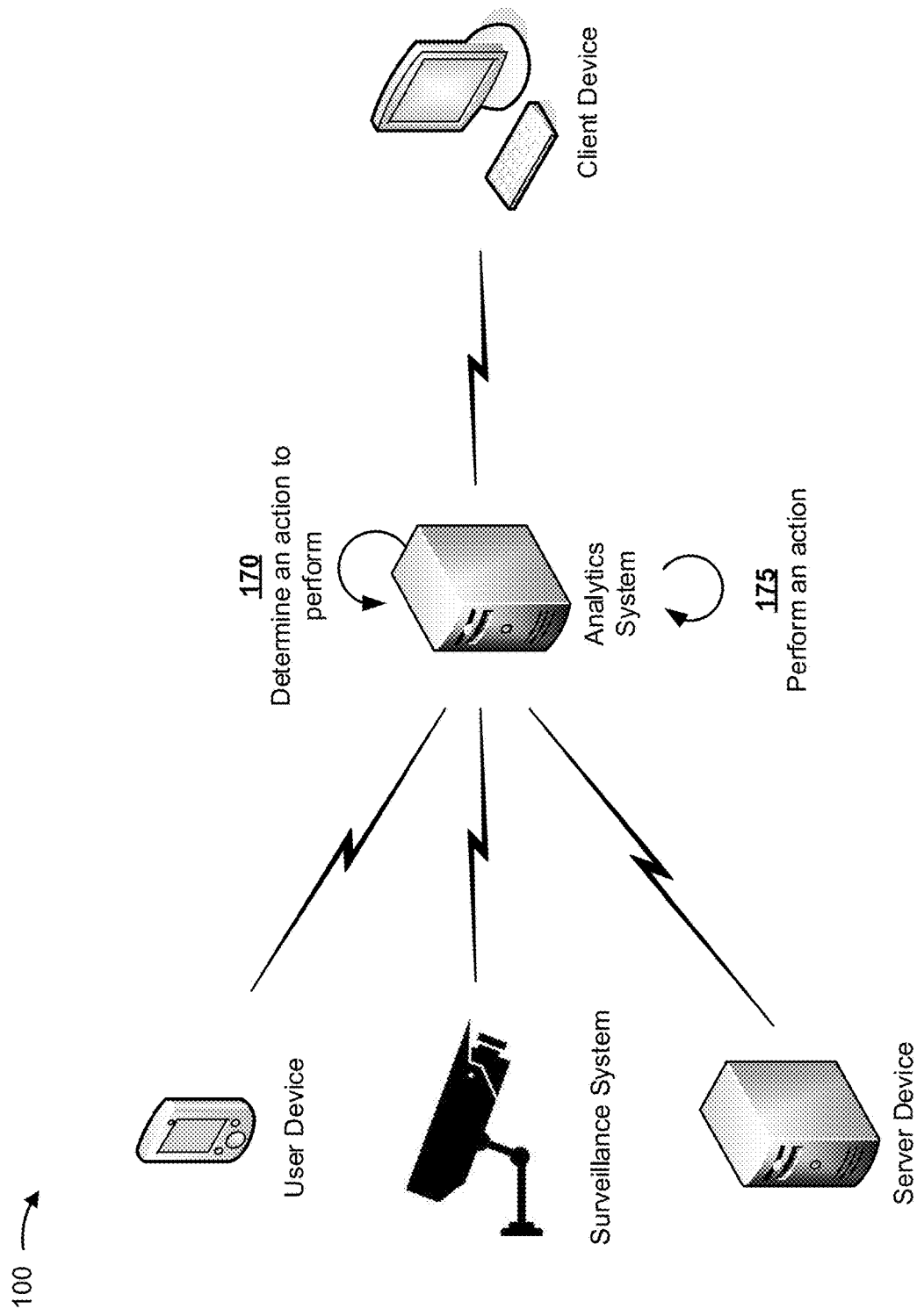

As shown in FIG. 1E, and by reference number 170, the analytics system may determine an action to perform based on the set of post-events of current event CE1. In some cases, the analytics system may determine the action to perform based on an action perform with respect to historical events HE1, HE2, and/or HE3. For example, the analytics system may determine, using data related to historical event HE1, that in historical event HE1, which is similar to current event CE1, three police officers were dispatched to the location of historical event HE1 but that the suspect escaped. Continuing with the previous example, the analytics system may determine to dispatch more than three police officers to the location of current event CE1 based on the suspect having escaped when three police officers were dispatched to a similar historical event.

In addition, the analytics system may determine an action to perform based on the likelihood of the post-events included in the set of post-events. For example, the analytics system may determine to perform an action for a post-event with a higher likelihood relative to another post-event prior to determining to perform an action for the other post-event.

As further shown in FIG. 1E, and by reference number 175, the analytics system may perform an action. For example, the analytics system may send a message to the client device indicating a post-event, may activate an alarm, or may send a message to a dispatch system to dispatch a police officer to the location of current event CE1.

In this way, the analytics system improves the determination of a pre-event and/or prediction of a post-event associated with a current event and facilitates performing an action based on the current event. In addition, the analytics system increases an efficiency of determining a pre-event and/or predicting a post-event by enabling automatic real-time or near real-time prediction of the pre-event and/or the post-event. Further, the analytics system also improves an accuracy of determining a pre-event and/or predicting a post-event, thereby conserving processing resources associated with inaccurately determining the pre-event and/or predicting the post-event. Further still, the analytics system improves safety by enabling quick and efficient performance of an action based on a current event, such as a criminal event.

As indicated above, FIGS. 1A-1E are provided merely as an example. Other examples are possible and may differ from what was described with regard to FIGS. 1A-1E. Although FIGS. 1A-1E are described in terms of a criminal event, implementations described herein are not limited to criminal events. For example, implementations may relate to other types of events, such as an emergency event, a traffic event (e.g., traffic congestion or a traffic accident), a manufacturing error/accident event, and/or the like.

Figure 2:
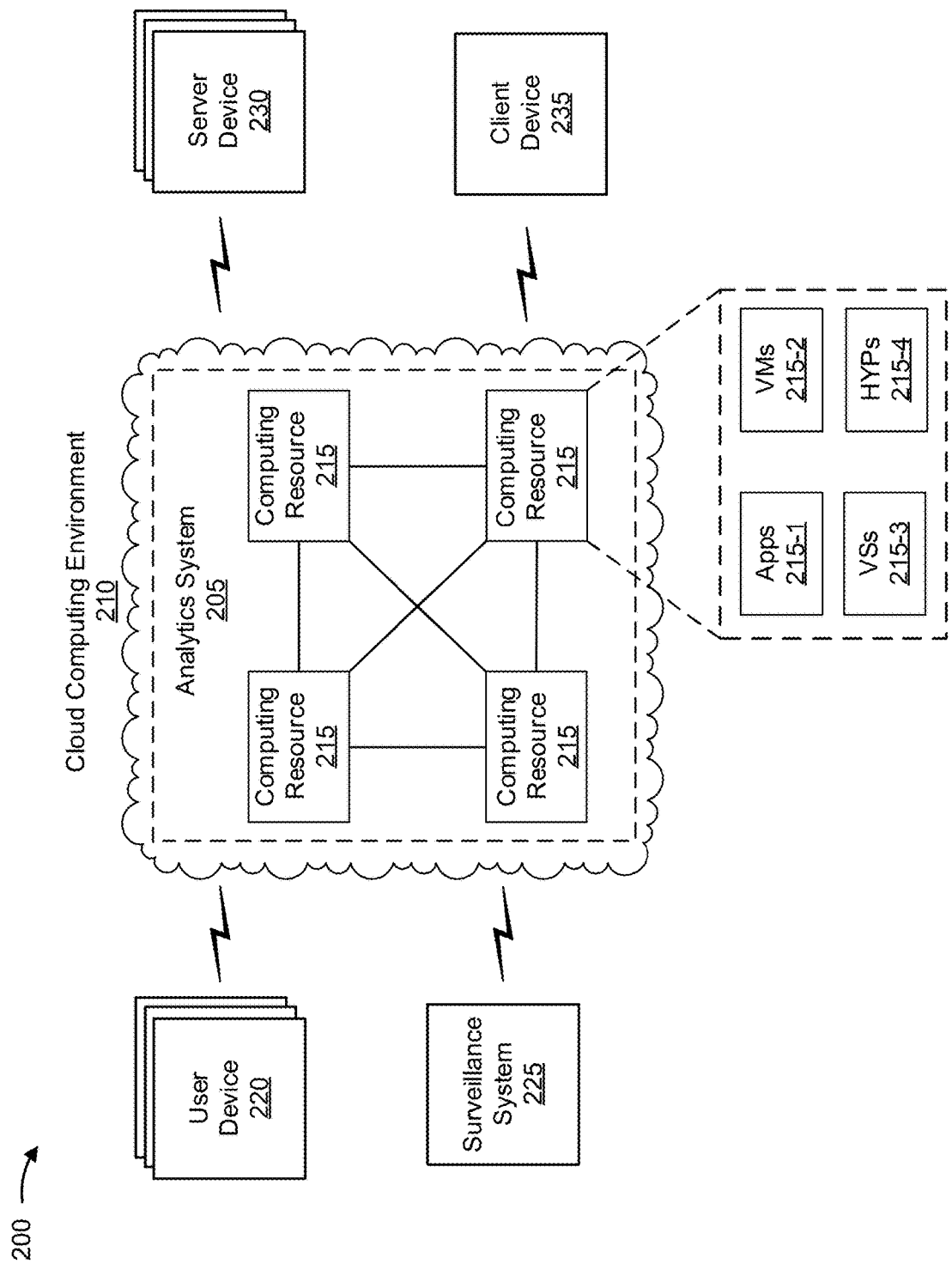
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an analytics system 205, a cloud computing environment 210, a set of computing resources 215, one or more user devices 220 (referred to collectively as "user devices 220," and individually as "user device 220"), a surveillance system 225, one or more server devices 230 (referred to collectively as "server devices 230," and individually as "server device 230"), and a client device 235. Devices of environment 200 may interconnect via wired connections, wireless connections, or a combination of wired and wireless connections.

Analytics system 205 includes one or more devices capable of determining a set of pre-events and/or a set of post-events for a current event. For example, analytics system 205 may include a cloud server or a group of cloud servers. In some implementations, analytics system 205 may be designed to be modular such that certain software components can be swapped in or out depending on a particular need. As such, analytics system 205 may be easily and/or quickly reconfigured for different uses.

In some implementations, as shown, analytics system 205 may be hosted in cloud computing environment 210. Notably, while implementations described herein describe analytics system 205 as being hosted in cloud computing environment 210, in some implementations, analytics system 205 may not be cloud-based (i.e., may be implemented outside of a cloud computing environment) or may be partially cloud-based.

Cloud computing environment 210 includes an environment that hosts analytics system 205. Cloud computing environment 210 may provide computation, software, data access, storage, etc. services that do not require end-user knowledge of a physical location and configuration of system(s) and/or device(s) that host analytics system 205. As shown, cloud computing environment 210 may include a group of computing resources 215 (referred to collectively as "computing resources 215" and individually as "computing resource 215").

Computing resource 215 includes one or more personal computers, workstation computers, server devices, or other types of computation and/or communication devices. In some implementations, computing resource 215 may host analytics system 205. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, one or more virtualized storages ("VSs") 215-3, or one or more hypervisors ("HYPs") 215-4.

Application 215-1 includes one or more software applications that may be provided to or accessed by one or more devices of environment 200. Application 215-1 may eliminate a need to install and execute the software applications on devices of environment 200. For example, application 215-1 may include software associated with analytics system 205 and/or any other software capable of being provided via cloud computing environment 210. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program, and may support a single process. In some implementations, virtual machine 215-2 may execute on behalf of a user (e.g., client device 235), and may manage infrastructure of cloud computing environment 210, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 may provide hardware virtualization techniques that allow multiple operating systems (e.g., "guest operating systems") to execute concurrently on a host computer, such as computing resource 215. Hypervisor 215-4 may present a virtual operating platform to the guest operating systems, and may manage the execution of the guest operating systems. Multiple instances of a variety of operating systems may share virtualized hardware resources.

User device 220 includes one or more devices capable of receiving, generating, storing, processing, and/or providing information associated with an event (e.g., a historical event and/or a current event). For example, user device 220 may include a communication and computing device, such as a mobile phone (e.g., a smart phone or a radiotelephone), a laptop computer, a tablet computer, a gaming device, a wearable communication device (e.g., a smart wristwatch, a pair of smart eyeglasses, or an activity band), or a similar type of device. In some implementations, user device 220 may transmit data and/or a message to analytics system 205 and/or server device 230, as described elsewhere herein. Additionally, or alternatively, user device 220 may receive data and/or a message from analytics system 205 and/or server device 230, as described elsewhere herein.

Surveillance system 225 includes one or more devices capable of receiving, generating, storing, processing, and/or providing information associated with a media item (e.g., an image, a set of images, video, and/or audio). For example, surveillance system 225 may include one or more cameras (e.g., one or more digital video cameras, still image cameras, infrared cameras, etc. installed at a location or at a premises), one or more server devices (e.g., one or more server devices 230), one or more client devices (e.g., one or more client devices 235), a closed-circuit television (CCTV) system, one or more microphones, or other similar types of devices/systems. In some implementations, surveillance system 225 may capture a media item (e.g., using one or more cameras and/or microphones), as described elsewhere herein. Additionally, or alternatively, surveillance system 225 may provide the media item and/or related metadata to analytics system 205, as described elsewhere herein.

Server device 230 includes one or more devices capable of receiving, generating, storing, processing, and/or providing information associated with a media item or an event. For example, server device 230 may include a server (e.g., in a data center or a cloud computing environment), a data center (e.g., a multi-server micro data center), a workstation computer, a virtual machine (VM) provided in a cloud computing environment, or a similar type of device. In some implementations, server device 230 may include a communication interface that allows server device 230 to receive information from and/or transmit information to other devices in environment 200. In some implementations, server device 230 may receive information associated with a media item or an event from user device 220, surveillance system 225, and/or client device 235, as described elsewhere herein. Additionally, or alternatively, server device 230 may provide the information to analytics system 205, as described elsewhere herein.

Client device 235 includes one or more devices capable of receiving, generating, storing, processing, and/or providing information associated with a media item (e.g., an image, video, or audio) or an event. For example, client device 235 may include a communication and/or computing device, such as a desktop computer, a video monitor, a mobile phone (e.g., a smart phone or a radiotelephone), a laptop computer, a tablet computer, a gaming device, a wearable communication device (e.g., a smart wristwatch, a pair of smart eyeglasses, or an activity band), or a similar type of device. In some implementations, client device 235 may receive information associated with a media item and/or an event from analytics system 205, as described elsewhere herein. Additionally, or alternatively, client device 235 may provide information associated with a media item and/or an event to analytics system 205, as described elsewhere herein.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
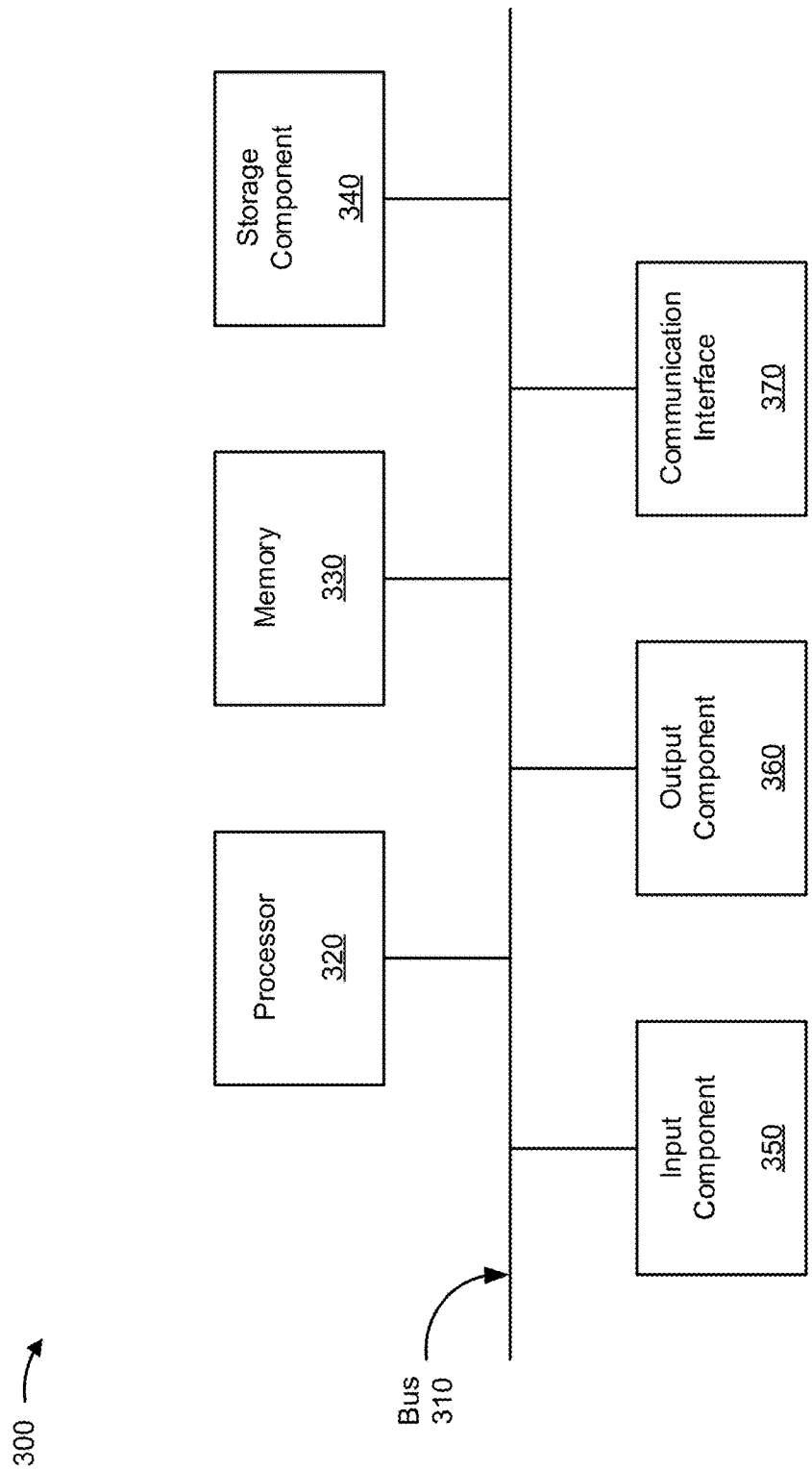
FIG. 3 is a diagram of example components of one or more devices of FIG. 2.

FIG. 3 is a diagram of example components of a device 300. Device 300 may correspond to analytics system 205, a set of computing resources 215, user device 220, surveillance system 225, server device 230, and/or client device 235. In some implementations, analytics system 205, a set of computing resources 215, user device 220, surveillance system 225, server device 230, and/or client device 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
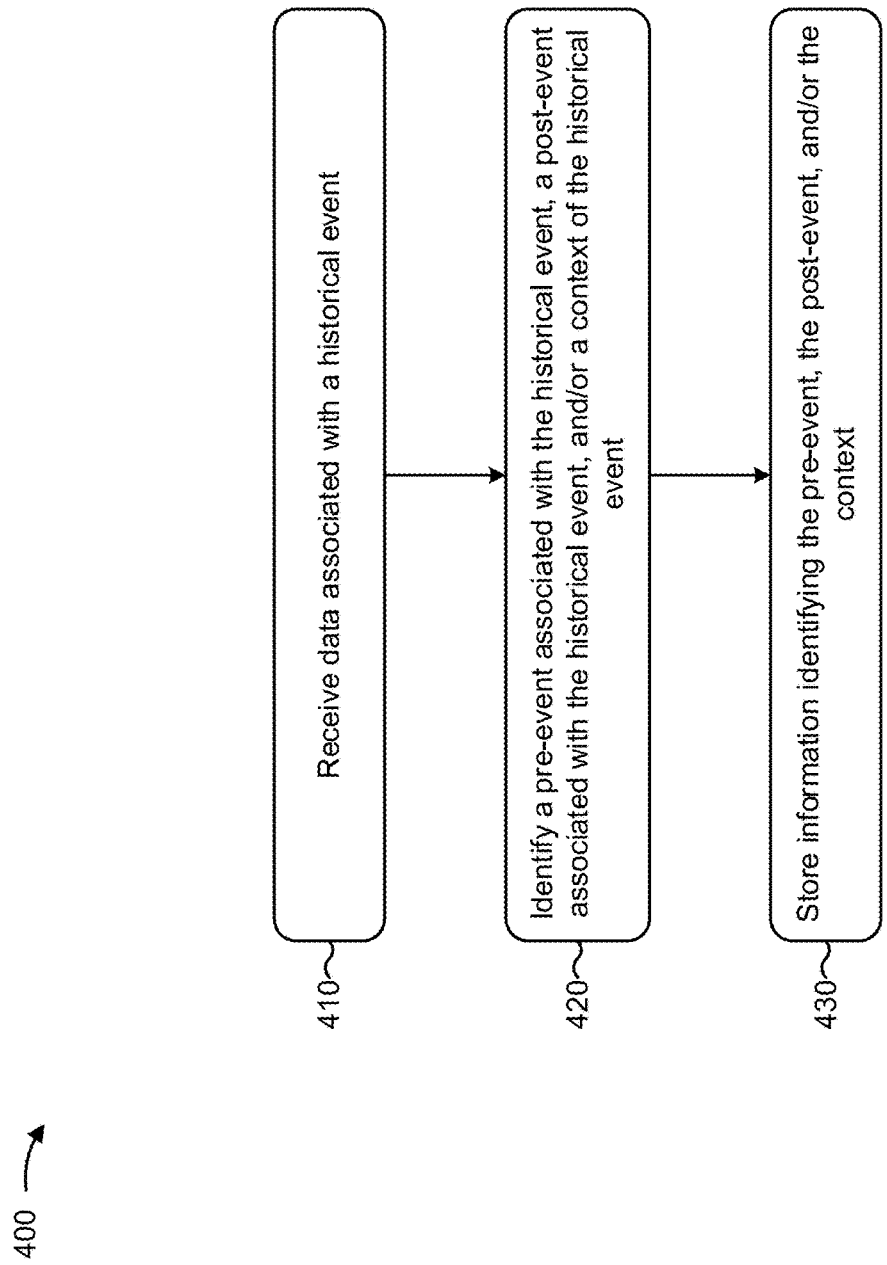
FIG. 4 is a flow chart of an example process for processing data related to a historical event.

FIG. 4 is a flow chart of an example process 400 for processing data related to a historical event. In some implementations, one or more process blocks of FIG. 4 may be performed by analytics system 205. In some implementations, one or more process blocks of FIG. 4 may be performed by another device or a group of devices separate from or including analytics system 205, such as user device 220, surveillance system 225, server device 230, and/or client device 235.

As shown in FIG. 4, process 400 may include receiving data associated with a historical event (block 410). For example, analytics system 205 may receive data associated with a historical event from user device 220, surveillance system 225, and/or server device 230. In some implementations, analytics system 205 may receive the data periodically, as the data is captured, determined, or inputted, according to a schedule, and/or based on input from a user of a device.

In some implementations, the data associated with the historical event may include text (e.g., a text document, a text file, a web page, a social media page, an article). For example, the data may include the text of a crime report or a news article, text data of a social media post, and/or the like. Additionally, or alternatively, the data associated with the historical event may include a media item, such as an image, a set of images, video, and/or audio (e.g., from user device 220 or surveillance system 225), and/or metadata associated with the media item. For example, the metadata may identify a location of a device that captured the media item, a time the media item was captured, or a device identifier of the device that captured the media item. Additionally, or alternatively, the data associated with the historical event may include a message (e.g., a short message service (SMS) message or an email) from a device, such as user device 220.

In some implementations, the data may include millions, billions, or trillions of data items related to thousands, millions, or billions of historical events. In some implementations, analytics system 205 may use a technique that can manage large quantities of data items (e.g., a big data technique) to process the data in the manner described herein.

In some implementations, the data associated with the historical event may identify a context of the historical event. For example, the data associated with the historical event may identify a particular day on which the historical event occurred, a time of day at which the historical event occurred, a location of the historical event, a device identifier that identifies a device that is sending the data, and/or the like. As a particular example, in the case in which the historical event is a crime event, the data associated with the historical crime event may identify tools or weapons used by a perpetrator of the crime event, a description of a suspected perpetrator of the crime event, a quantity of police officers deployed to the scene of the crime event, a badge number or other identifier of a police officer deployed to the scene of the crime event, and/or the like.

In some implementations, analytics system 205 may process the data (e.g., using computer vision, image analysis, audio analysis, video analysis, etc.), as described in more detail below. Additionally, or alternatively, another device, such as another analytics system 205, surveillance system 225, and/or server device 230 may process the data and store the data in a repository, which analytics system 205 may access.

In this way, analytics system 205 may quickly and efficiently receive data associated with a historical event, thereby conserving processing resources.

As further shown in FIG. 4, process 400 may include identifying a pre-event associated with the historical event, a post-event associated with the historical event, and/or a context of the historical event (block 420) and storing information identifying the pre-event, the post-event, and/or the context (block 430). For example, analytics system 205 may identify a pre-event associated with the historical event, a post-event associated with the historical event, and/or a context associated with the historical event based on the received data. In some implementations, analytics system 205 may store information identifying the pre-event, the post-event, and/or the context.

In some implementations, analytics system 205 may identify the pre-event associated with the historical event, the post-event associated with the historical event, and/or the context associated with the historical event based on processing the received data. For example, analytics system 205 may process the data using a processing technique. In some implementations, analytics system 205 may process the received data to identify a term and/or a tag included in the received data. For example, analytics system 205 may process text from a crime report and/or metadata associated with a media item using natural language processing, text analysis, computational linguistics, machine learning, and/or artificial intelligence to perform term lemmatization or term extraction to identify a set of characters, such as a character string, a misspelled word, an acronym, a tag, and/or the like. In this way, analytics system 205 may quickly and efficiently identify a term and/or a tag included in the received data, thereby conserving processing resources.

In some implementations, analytics system 205 may generate a list of unique terms included in the received data. For example, analytics system 205 may generate a list of unique terms based on identifying a term and/or a tag included in the received data. In some implementations, a term included in the list of unique terms may identify a pre-event of the historical event, a post-event of the historical event, and/or a context of the historical event. For example, analytics system 205 may use a data structure that includes terms and information indicating whether the terms are associated with an event or a context of an event to determine whether the term identifies a pre-event, a post-event, and/or a context.

In some implementations, analytics system 205 may perform a lookup of a term in a data structure and identify corresponding information that indicates whether the term is associated with a pre-event, a post-event, and/or a context. For example, analytics system 205 may perform a lookup of a term that identifies a city in which a historical event occurred. Continuing with the previous example, analytics system 205 may identify corresponding information that indicates that the term identifies a context of the historical event (e.g., rather than identifying a pre-event or a post-event of the historical event).

In some implementations, analytics system 205 may process an image. For example, analytics system 205 may process the image to identify an event shown in the image (e.g., a pre-event or a post-event associated with a historical event) and/or a context of the event. In some implementations, analytics system 205 may process the image using a technique. For example, analytics system 205 may process the image using machine learning, pattern recognition, object detection, computer vision, and/or the like to detect an object shown in the image, edges of the object, a pattern shown in the image, and/or the like.

In some implementations, analytics system 205 may identify a pre-event, a post-event, and/or a context of the historical event shown in the image based on detecting the object, the edges of the object, and/or the pattern. For example, analytics system 205 may use a data structure that includes information identifying various objects or patterns that may be shown in an image and an associated event or context to identify the pre-event, the post-event, and/or the context. Continuing with the previous example, analytics system 205 may perform a lookup in a data structure using information that identifies an object shown in an image and identify corresponding information that indicates that the object identifies a context of a historical event shown in the image. In this way, analytics system 205 may quickly and efficiently process the data to permit identification of a pre-event, a post-event, and/or a context included in the data, thereby conserving processing resources. In addition, in this way, analytics system 205 may identify a pre-event, a post-event, and/or a context of a historical event in an objective manner, thereby reducing or eliminating errors that would occur with identification in a subjective manner.

In some implementations, analytics system 205 may determine whether an identified event is a pre-event or a post-event. For example, analytics system 205 may determine whether the identified event is a pre-event or a post-event based on the data and/or other information associated with the historical event. In some implementations, analytics system 205 may determine whether the identified event is a pre-event or a post-event using temporal data. For example, temporal data may include metadata or a timestamp that indicates a date or a time at which the historical event and/or the identified event occurred, thereby permitting analytics system 205 to determine whether the identified event occurred before or after the historical event. In this way, analytics system 205 may use temporal data to categorize an identified event as a pre-event or a post-event associated with a historical event, thereby reducing an amount of processing associated with categorization and thereby conserving processing and/or memory resources. In addition, analytics system 205 may increase an accuracy of determining whether an identified event is a pre-event or a post-event, thereby conserving processing resources.

Additionally, or alternatively, analytics system 205 may determine whether the identified event is a pre-event or a post-event associated with a historical event based on a type of the event. For example, analytics system 205 may identify a type of the event using the received data. In some implementations, analytics system 205 may identify the type of an event based on processing the data. For example, analytics system 205 may process the data to identify a term or a tag included in the data and using a data structure to identify a type of the event associated with the term or tag and whether the type of event is associated with being a pre-event or a post-event. As another example, analytics system 205 may identify an object in an image and use a data structure to identify a type of the object and whether the type of the object is associated with a pre-event or a post-event. This conserves processing resources of analytics system 205 by permitting analytics system 205 to perform fewer lookups relative to performing lookups based on the term or the object.

In some implementations, analytics system 205 may store information identifying the context, the pre-event, and/or the post-event. For example, analytics system 205 may store the information using memory resources of analytics system 205. In some implementations, analytics system 205 may store the information using a data structure. Additionally, or alternatively, analytics system 205 may store the information using a knowledge base and/or a knowledge graph that structures the information into a set of hierarchical relationships (e.g., where two events that are associated with the same geographic location, such as a city, state, or country are associated with the same node in the knowledge base or knowledge graph). Additionally, or alternatively, analytics system 205 may store the information in a log of events. For example, analytics system 205 may generate a log entry, in a log of events that includes data associated with a pre-event, a post-event, and/or a context of the historical event.

In some implementations, when storing the information in the log of events, analytics system 205 may store the information in a particular manner. For example, analytics system 205 may store the information such that analytics system 205 can identify a historical event, a pre-event associated with the historical event, a post-event associated with the historical event, and/or a context of the historical event (e.g., by associating the information with an identifier that identifies the historical event).

In this way, analytics system 205 may identify a pre-event, a post-event, and/or a context of a historical event and store information identifying the pre-event, the post-event, and/or the context of a historical event. This conserves processing resources by permitting quick and efficient access to the information and/or by reducing or eliminating a need for analytics system 205 to re-determine the pre-event, the post-event, and/or the context of the historical event. In addition, this permits analytics system 205 to use the information in various ways. For example, analytics system 205 may use the information as a training set for machine learning, such as to improve identification of a pre-event, a post-event, and/or a context of a historical event. As another example, analytics system 205 may provide the information to another analytics system 205. This may conserve processing resources of the other analytics system 205 by reducing or eliminating the need for the other analytics system 205 to identify the pre-event, the post-event, and/or the context of the historical event.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
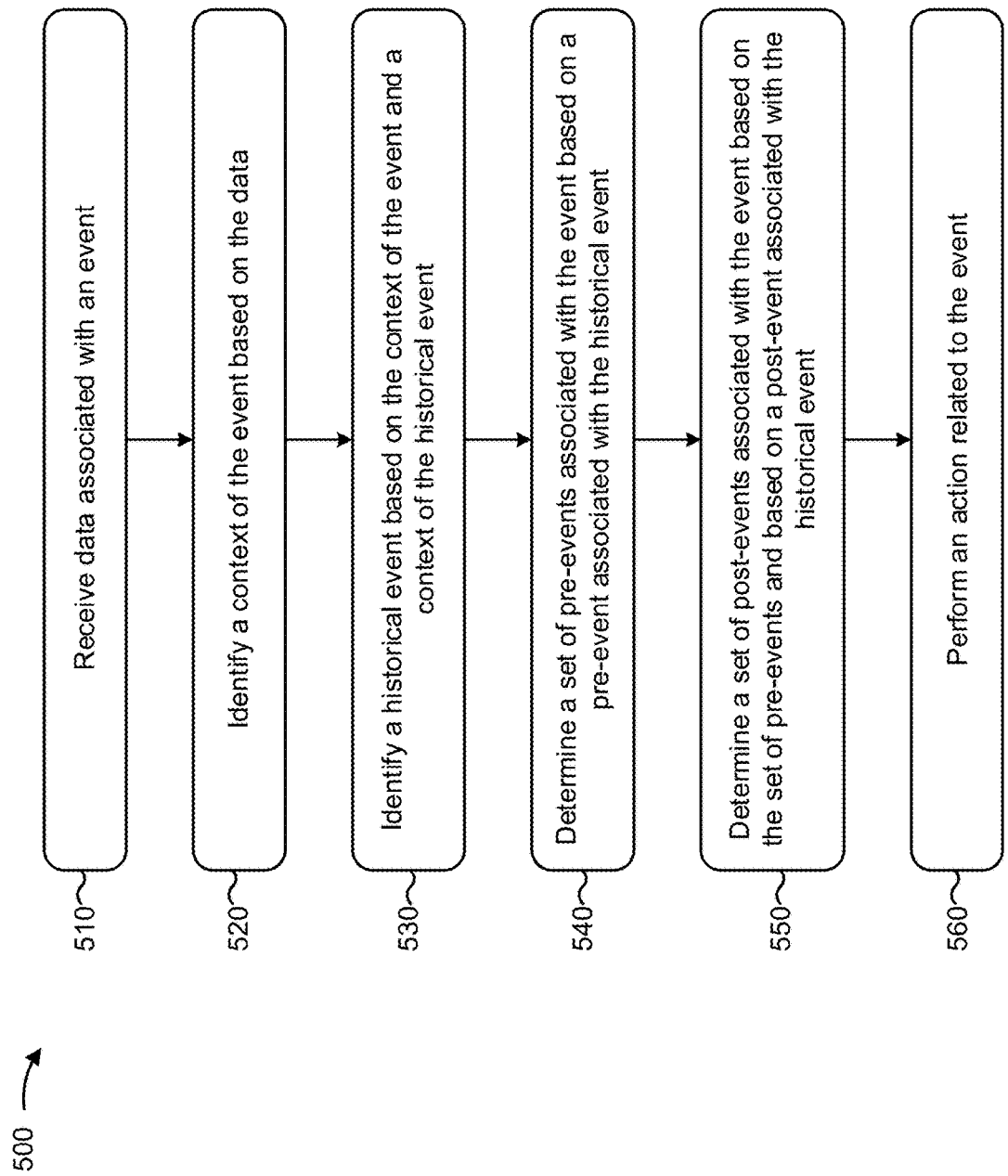
FIG. 5 is a flow chart of an example process for automatically predicting an event based on data.

FIG. 5 is a flow chart of an example process 500 for automatically predicting an event based on data. In some implementations, one or more process blocks of FIG. 5 may be performed by analytics system 205. In some implementations, one or more process blocks of FIG. 5 may be performed by another device or a group of devices separate from or including analytics system 205, such as user device 220, surveillance system 225, server device 230, and/or client device 235.

As shown in FIG. 5, process 500 may include receiving data associated with an event (block 510) and identifying a context of the event based on the data (block 520). For example, analytics system 205 may receive data associated with an event and identify the event or a context of the event based on the received data.

In some implementations, analytics system 205 may receive the data in a manner similar to that described above. For example, analytics system 205 may automatically receive the data from user device 220, surveillance system 225, and/or server device 230 in real-time, in near real-time, periodically, and/or according to a schedule. In some implementations, the data may relate to a current event. For example, analytics system 205 may receive data related to an event that has occurred within a threshold amount of time of when analytics system 205 receives the data (e.g., based on temporal data).

In some implementations, analytics system 205 may identify the current event or a context of the current event in a manner similar to that described above with respect to a historical event. For example, analytics system 205 may process the data using a processing technique. In some implementations, analytics system 205 may store the information associated with the current event in a manner similar to that described above.

In this way, analytics system 205 may automatically receive information related to the event from various sources and identify the event and/or a context of the event, thereby conserving processing resources. In addition, in this way, analytics system 205 may accurately identify the event and/or a context of the event, thereby conserving processing resources that would otherwise be used to inaccurately identify the event and/or the context of the event.

As further shown in FIG. 5, process 500 may include identifying a historical event based on the context of the event and a context of the historical event (block 530). For example, analytics system 205 may identify a similar historical event using stored information that identifies the context of a current event and the context of the historical event.

In some implementations, analytics system 205 may use a technique to identify the historical event (e.g., the similar historical event). For example, analytics system 205 may use a canonical correlation technique to identify a historical event that has a context similar to the current event. Continuing with the previous example, analytics system 205 may use the canonical correlation technique to identify a correlation among information related to the current event and information related to the historical event by identifying semantically similar terms or tags in the information related to the current event and the historical event. Additionally, or alternatively, analytics system 205 may use the canonical correlation technique using semantically similar terms that identify similar objects shown in images associated with the current event and the historical event.

In some implementations, analytics system 205 may determine a score when using the canonical correlation technique. For example, the score may indicate a correlation between data of the current event and data of a historical event. In some implementations, when analytics system 205 uses a canonical correlation technique, analytics system 205 may identify a set of similar historical events when the correlation of semantically similar terms, identified objects, and/or the like between the set of historical events and the current event satisfies a threshold (e.g., when a score generated using the canonical correlation technique satisfies a threshold).

In some implementations, when using the technique, analytics system 205 may identify a historical event with a similar context to the event. In some implementations, when using the technique to identify a similar historical event, analytics system 205 may identify a historical event that occurred in a location similar to the current event. Additionally, or alternatively, analytics system 205 may identify a historical event that occurred at a similar time of day as the current event. Additionally, or alternatively, analytics system 205 may identify a historical event that occurred on a similar day of the week as the current event.

Additionally, or alternatively, and using a criminal event as an example, analytics system 205 may identify a historical criminal event that involved the use of similar tools as the current criminal event, such as a similar make, model, or type of vehicle used (e.g., a car, a truck, a van, a bike, or a motorcycle), a similar weapon used, a similar technique used (e.g., a similar method of entry, such as via a window, a back door, a basement door, a garage, etc.), and/or the like. Additionally, or alternatively, analytics system 205 may identify a historical event that included the same individual as the current event. For example, and using a crime event as an example, analytics system 205 may identify a historical event that included the same suspect, or a similar description of a suspect, the same victim, the same police officer that was dispatched, the same witness, and/or the like.

In some implementations, analytics system 205 may use a filter when identifying the similar historical event. For example, analytics system 205 may apply a filter to filter identified historical events based on particular information. In some implementations, analytics system 205 may use a temporal filter when identifying the similar historical event. For example, analytics system 205 may use a temporal filter to identify a historical event that occurred within a particular time period prior to the current event, occurred during a particular time of day, occurred on a particular day of the week, occurred within a threshold amount of time before the current event, and/or the like. Additionally, or alternatively, analytics system 205 may use a geographic filter. For example, analytics system 205 may use the geographic filter to identify a historical event that occurred in a particular geographic location, a threshold distance from a particular location, in the same, or a similar, location as the current event, and/or the like.

In some implementations, analytics system 205 may store a result of identifying the similar historical events. For example, analytics system 205 may store information identifying an event, a historical event that is similar to the event, a context of the event or the historical event, a pre-event associated with the historical event, and/or the like. In some implementations, analytics system 205 may use the stored information as a training set for a machine learning algorithm. This improves identification of a historical event that is similar to an event, thereby conserving processing resources. Additionally, or alternatively, analytics system 205 may provide the stored information to another analytics system 205. This conserves processing resources of the other analytics system 205 by reducing or eliminating a need for the other analytics system 205 to identify the similar historical event.

In this way, analytics system 205 may quickly and efficiently identify a historical event that is similar to an event (e.g., a current event), thereby conserving processing resources. In addition, this increases an accuracy of identifying a historical event similar to a current event, thereby conserving processing resources that would otherwise be used to inaccurately identify a similar historical event.

As further shown in FIG. 5, process 500 may include determining a set of pre-events associated with the event based on a pre-event associated with the historical event (block 540). For example, analytics system 205 may determine a set of pre-events associated with a current event based on one or more pre-events associated with the historical event.

In some implementations, analytics system 205 may identify a pre-event associated with a similar historical event. For example, analytics system 205 may identify a pre-event of the historical event using previously stored information that identifies a pre-event associated with the historical event. In some implementations, analytics system 205 may identify multiple pre-events for multiple historical events.

In some implementations, analytics system 205 may identify a pre-event that is common to a threshold quantity of historical events, such as when analytics system 205 identifies multiple pre-events for multiple historical events. In some implementations, analytics system 205 may match a term and/or a tag in data associated pre-events of a threshold quantity or percentage of similar historical events. For example, analytics system 205 may match the term "scouting" or "suspicious person" in a threshold quantity or percentage crime reports associated with historical events that occurred before a historical burglary event. In this case, analytics system 205 may identify a scouting event or a suspicious person event as a pre-event of a burglary event. In this way, analytics system 205 may identify a pre-event of a historical event based on semantics of the data associated with the historical event.

Additionally, or alternatively, in the case of an image and/or video, analytics system 205 may match an object identified in an image related to a pre-event that is associated with a threshold quantity or percentage of historical events to identify a pre-event. For example, analytics system 205 may process images of pre-events of historical events and determine that the same vehicle is present in images of the location of the burglary event and at the same time as the burglary event for a threshold quantity of days prior to the burglary event. In this case, analytics system 205 may identify the presence of the same vehicle at the same location and at the same time as a pre-event of a historical event (e.g., indicating scouting activity). In this way, analytics system 205 may identify a pre-event that is associated with a threshold quantity or percentage of historical events, thereby improving identification of a pre-event.

In some implementations, analytics system 205 may use a homophily technique (e.g., to determine a score, such as a homogeneity metric or a similarity score) to determine a correlation between two events. For example, analytics system 205 may use a homophily technique to determine a semantic similarity between identified pre-events of historical events and a current event. In some implementations, analytics system 205 may use the homophily technique to identify pre-events of historical events that are semantically similar to a current event. For example, analytics system 205 may identify pre-events that are semantically similar to the current event when information related to pre-events and the current event include semantically similar terms, a threshold quantity of semantically similar terms, a threshold quantity of similar nodes in a knowledge graph, when analytics system 205 determines a threshold score, and/or the like.

In some implementations, analytics system 205 may use machine learning, train a model, and/or the like to identify pre-events of historical events that are semantically similar to a current event. For example, analytics system 205 may use data related to a previously used homophily technique to train a model to identify pre-events using the homophily technique.

In some implementations, the homophily technique may be represented by an equation or a formula. For example, the homophily technique may be represented by the equation:

$$S(E_i, E_j, KG) = \left( \frac{\text{total quantity of connected nodes}}{\text{total quantity of nodes in knowledge graph}} \right) \quad (1)$$

where $\forall i \neq j$

In equation 1, the term S may represent a score determined using equation 1 that indicates a similarity between two events. For example, a threshold score may indicate that two events include semantically similar or dissimilar terms. Continuing with equation 1, the term Ei may represent event i, the term Ej may represent event j, and the term KG may represent that a relationship between data in a knowledge graph for events i and j is used to determine the score, the term total quantity of connected nodes may represent a total quantity of nodes in the knowledge graph that data related to events i and j have in common (e.g., if events i and j occur in the same city, then data identifying a location of events i and j may have a "city" node in common in the knowledge graph), and the term $\forall i \neq j$ may represent that events i and j are different events.

In some implementations, analytics system 205 may determine multiple scores for multiple sets of events. For example, analytics system 205 may determine a first similarity score for a first event and a second event, a second similarity score for the first event and a third event, and a third similarity score for the second event and the third event. In some implementations, when analytics system 205 determines multiple scores, analytics system 205 may determine an order, a rank, or a priority (e.g., high, medium, low, first, second, third, etc.) for the scores. For example, analytics system 205 may determine the order, rank or priority by organizing the similarity scores from highest score to lowest score, from lowest score to highest score, based on other information associated with the events for which the score was determined, such as temporal proximity between the events, a geographic proximity of the events, and/or the like.

In some implementations, analytics system 205 may determine an order, a rank or a priority of historical events based on the similarity score. For example, assume that analytics system 205 has determined similarity scores for a first current event and a first historical event, and for the first current event a second historical event. Further assume, for example, that a first similarity score for the first current event and the first historical event is higher relative to a second similarity score for the first current event and the second historical event. In this case, analytics system 205 may determine a higher order, rank, or priority for the first historical event relative to the second historical event based on the first similarity score having a higher value relative to the second similarity score.

In some implementations, analytics system 205 may normalize information related to pre-events of historical events similar to the current event. For example, analytics system 205 may normalize the pre-events to determine an order of the pre-events across different historical events, a timing of the pre-events across different historical events, and/or the like. In some implementations, analytics system 205 may normalize the pre-events using information related to timing of a pre-event relative to the historical event with which the pre-event is associated. For example, analytics system 205 may determine a temporal distance of a pre-event from a historical event and compare the temporal distance of the pre-event to other pre-events of the same historical event and/or a different historical event to determine an order of the pre-events. Continuing with the previous example, analytics system 205 may determine a quantity of days and/or hours that a first pre-event occurred before a first historical event and may compare that information to a second pre-event associated with the first event or a second historical event to determine whether the first pre-event occurred before or after the second pre-event.

In some implementations, analytics system 205 may determine an average temporal distance that a pre-event has occurred before a historical event across multiple historical events using information associated with the multiple historical events. For example, analytics system 205 may determine that a pre-event has occurred, on average, a particular quantity of days or hours before a historical event. In this way, analytics system 205 may normalize pre-events across multiple historical events to permit comparison of the pre-events of the historical.

In some implementations, analytics system 205 may determine a timing of pre-events of a historical event (e.g., using temporal data related to the pre-events). For example, analytics system 205 may determine a timing of steps of a historical event. In some implementations, analytics system 205 may determine a set of pre-events for a current event based on a timing of the steps of the pre-events of the historical event. For example, analytics system 205 may determine that a set of particular pre-events occurred prior to a current event based on the timing (e.g., an order) of each pre-event of a set of pre-events that occurred prior to a historical event. In this way, analytics system 205 may determine a pre-event based on the timing of steps of pre-events of a historical event.

In some implementations, analytics system 205 may determine a type or a grouping of a pre-event when normalizing pre-events. For example, and using a crime event as an example, analytics system 205 may determine a first pre-event (e.g., a suspicious person event) and a second pre-event (e.g., a suspicious vehicle event) are scouting type events. In this case, when normalizing the first and second pre-events, analytics system 205 may normalize the first and second pre-events based on the first and second pre-events being scouting type events (e.g., where the first and second pre-event are normalized as scouting events rather than as suspicious person and suspicious vehicle events).

In some implementations, analytics system 205 may use nodes of a knowledge graph to identify a type or a grouping of a pre-event. For example, analytics system 205 may determine whether two or more pre-events are associated with information that is semantically similar based on having a node of a knowledge graph in common and may determine a type or grouping of the pre-events based on the common node. As a specific example, analytics system 205 may determine that a suspicious person pre-event and a suspicious vehicle pre-event are scouting type pre-events based on both being associated with the node "suspicious" in the knowledge graph.

In some implementations, analytics system 205 may determine a set of pre-events for the event based on identifying a pre-event associated with a historical event. For example, analytics system 205 may determine a set of pre-events for a current event based on a pre-event associated with a historical event. In some implementations, analytics system 205 may determine to include a pre-event in the set of pre-events based on identifying a term, or semantically similar terms, included in the data for a threshold quantity or historical events. For example, assume that analytics system 205 identifies multiple historical events that have a similar context to the event.

Continuing with the previous example, analytics system 205 may identify a term, such as "suspicious," or a term that is semantically similar to the term "suspicious," in data for pre-events of a threshold quantity of the multiple historical events. In this case, analytics system 205 may include the pre-event in the set of pre-events based on the term "suspicious," or a semantically similar term, being included in data for pre-events of a threshold quantity of the multiple historical events. In some implementations, analytics system 205 may determine an order for the pre-events included in the set of pre-events. For example, analytics system 205 may determine an order for pre-events included in the set of pre-events based on the normalized order determined for the pre-events of the similar historical events.

In this way, analytics system 205 may quickly and efficiently determine a set of pre-event associated with an event based on pre-events associated with historical events, thereby improving determination of the set of pre-events.

As further shown in FIG. 5, process 500 may include determining a set of post-events associated with the event based on the set of pre-events and based on a post-event associated with the historical event (block 550). For example, analytics system 205 may determine a set of post-events associated with the current event based on a set of pre-events associated with the current event and based on a post-event associated with a historical event that is similar to the current event.

In some implementations, analytics system 205 may use the set of pre-events to identify a historical event that has pre-events similar to the set of pre-events associated with a current event. For example, assume that the set of pre-events includes a first and a second pre-event. In this case, analytics system 205 may use information related to the first and second pre-events to identify a historical event that has pre-events similar to the first pre-event and/or the second pre-event. In some implementations, analytics system 205 may identify the historical event with similar pre-events based on comparing terms associated with the set of pre-events and terms associated with the pre-events of the historical event and identify the historical event when the comparison indicates a match.

Additionally, or alternatively, analytics system 205 may use a homophily technique for the set of pre-events and pre-events of historical events in a manner similar to that described above to determine a historical event associated with pre-events similar to the set of pre-events. For example, analytics system 205 may determine that a historical event is associated with pre-events similar to the set of pre-events when a score from the homophily technique satisfies a threshold. In this way, analytics system 205 may quickly and efficiently identify a historical event associated with pre-events that are similar to the set of pre-events of an event, thereby conserving processing resources.

In some implementations, analytics system 205 determine the set of post-events based on the post-events associated with the historical events that have pre-events similar to the set of pre-events. For example, analytics system 205 may identify post-events that are associated with a threshold quantity or percentage of historical events and may include the post-events that are associated with the threshold quantity of historical events in the set of post-events.

In some implementations, analytics system 205 may determine the set of post-events using a knowledge graph. For example, analytics system 205 may use a knowledge graph that includes data related to a historical event, such as data that identifies, or is associated with, the context of the historical event, a pre-event associated with the historical event, and/or a post-event associated with the historical event. In some implementations, analytics system 205 may map data associated with an event to the same knowledge graph used for the historical events. For example, analytics system 205 may map data related to the context of a current event or the set of pre-events for the current event to the knowledge graph.

In some implementations, when using a knowledge graph, analytics system 205 may identify a historical event based on a semantic similarity between a current event and the historical event. For example, analytics system 205 may identify a historical event that is associated with terms that are semantically similar to the terms associated with the current event (e.g., a threshold quantity of terms, a threshold percentage of terms, etc.).

Additionally, or alternatively, when using a knowledge graph, analytics system 205 may identify a historical event that is associated with pre-events similar to the set of pre-events based on nodes of the knowledge graph that are common to data related to the pre-events associated with the historical event and data related to the set of pre-events. For example, analytics system 205 may determine that pre-events associated with a historical event are similar to the set of pre-events associated with an event when data related to the pre-events and the set of pre-events has a threshold quantity or percentage of nodes in common. In some implementations, analytics system 205 may determine the set of post-events by identifying post-events associated with the historical events that have pre-events similar to the set of pre-events.

In some implementations, analytics system 205 may use a predictive modeling technique to determine a set of post-events for an event based on data associated with a historical event. For example, analytics system 205 may identify a post-event of the historical event and predict a post-event for the current event based on terms associated with a post-event of a historical event, a semantic similarity between a pre-event of the historical event and a set of pre-events for a current event, and/or the like.

In some implementations, analytics system 205 may use machine learning, train a model, and/or the like to determine whether a pre-event associated with a historical event is similar to the set of pre-events. For example, analytics system 205 may use data related to a previous determination to train a model perform another determination of whether a pre-event associated with a historical event is similar to the set of pre-events.

In some implementations, analytics system 205 may use a formula or an equation to determine whether a pre-event associated with a historical event is similar to the set of pre-events. For example, analytics system 205 may use an equation or a formula to determine a score that indicates a semantic similarity of data (e.g., terms or tags) related to a pre-event of a historical event and the set of pre-events of a current event. In some implementations, the equation or formula may be represented by the following steps:

Step 1: $\text{sum}(E_R, E_H^I) = \text{sum}(\{F_R^1, \ldots, F_R^h\}, \{F_{H_i}^1, \ldots, F_{H_r}^k\})$ where $i \in \{1, n\}$ Step 2: $\text{Max}(\text{sum}(E_R, E_H^I))$  (2)

In equation 2, the term $\text{sum}(E_R, E_H^I)$ may represent that analytics system 205 is to find the total quantity of common or connected nodes of a knowledge graph between events $E_R$ (a current event) and $E_H^I$ (a historical event), the term $\{F_R^1, \ldots, F_R^h\}$ may represent pre-events for event $E_R$ and the term $\{F_{H_i}^1, \ldots, F_{H_r}^k\}$ may represent pre-events for event $E_H^I$, the term $i \in \{1, n\}$ may represent that there is at least one pre-event associated with the historical event, and the term $\text{Max}(\text{sum}(E_R, E_H^I))$ may represent that analytics system 205 identifies a historical event with a threshold, or maximum, quantity of nodes in common with the current event relative to other historical events, indicating that the historical event is most similar to the current event (e.g., relative to other historical events). In some implementations, analytics system 205 may determine the set of post-events by identifying post-events of historical events where the score satisfies a threshold.

In some implementations, analytics system 205 may determine a likelihood (e.g., severity level, such as high, medium, or low) for the set of post-events. For example, a likelihood for the set of post-events may indicate how a post-event included in the set of post-events is to occur. In some implementations, analytics system 205 may determine the likelihood for the set of post-events using a data structure, a log, or a dictionary. For example, the data structure, log, or dictionary may include terms and/or tags and corresponding likelihoods associated with the terms and/or tags. In some implementations, analytics system 205 may perform a lookup of a term and/or a tag associated with a post-event included in the set of post-events in a data structure that includes information identifying a set of terms and/or tags and determine a corresponding likelihood identified by the data structure.

Additionally, or alternatively, analytics system 205 may determine a likelihood for the set of post-events based on a frequency with which a post-event, or a similar post-event, occurs with respect to historical events. For example, analytics system 205 may determine a likelihood for a post event included in the set of post-events when the post-event, or a similar post-event, has occurred with respect to a threshold quantity or percentage of historical events that are similar to the current event. In this way, analytics system 205 may quickly and efficiently determine a likelihood of a post-event included in the set of post-events, thereby conserving processing resources.

In some implementations, analytics system 205 may determine a severity of a set of post-events. For example, analytics system 205 may determine a high severity, a medium severity, or a low severity for a set of post-events. In some implementations, analytics system 205 may use a data structure to determine the severity of a set of post-events. For example, the data structure may include information that identifies historical events that are similar to the set of post-events and information identifying a severity of the similar historical events. In some implementations, when using the data structure, analytics system 205 may identify a severity of a similar historical event and determine a severity of a set of post-events based on the severity of the similar historical event. In this way, analytics system 205 may determine a severity of a set of post-events.

In some implementations, analytics system 205 may identify an action associated with a post-event of a historical event. For example, analytics system 205 may identify an action using data associated with the historical event. In some implementations, an action may include an action taken with respect to the historical event and/or a post-event of the historical even. For example, if a historical event is a burglary event, an action may include deployment of a particular quantity of law enforcement officers to the location of the burglary event.

In some implementations, analytics system 205 may determine a set of actions to perform with respect to an event based on an action taken with respect to a similar historical event and/or a post-event similar to the set of post-events. For example, analytics system 205 may use data associated with a historical event and/or a post-event of the historical event to identify a set of actions that could be taken with respect to a current event based on the current event and the historical event being similar, based on the set of post-events for the current event and a post-event for the historical event being similar, and/or the like.

In some implementations, analytics system 205 may determine a score for each action included in the set of actions. For example, analytics system 205 may use a Bayesian model or a Bayesian network to determine a Bayesian probability (e.g., using a Bayesian probability technique) for an action included the set of actions. Continuing with the previous example, the Bayesian probability may indicate a likelihood that the action would be associated with a similar historical event or a historical event with a post-event similar to the set of post-events. In this way, analytics system 205 may determine a set of actions for an event based on an action related to a similar historical event and/or a historical event with a post-event similar to set of post-events determined for the event.

In some implementations, analytics system 205 may determine an order, a rank, or a priority for the set of actions. For example, analytics system 205 may determine an order, a rank, or a priority of the actions included in the set of actions based on the score determined for each action included in the set of actions. Continuing with the previous example, analytics system 205 may order actions included in the set of actions from highest score to lowest score, lowest score to highest score, and/or the like. This permits analytics system 205 to prioritize an action relative to other actions, thereby improving selection of an action to perform and conserving processing resources that would otherwise be used to perform a low priority action.

In some implementations, analytics system 205 may permit identification of a set of pre-events that caused analytics system 205 to determine a set of post-events. For example, analytics system 205 may determine that a particular set of pre-events caused analytics system 205 to determine a particular set of post-events. In this way, analytics system 205 may track the determination of the set of post-events based on the set of pre-events.

In this way, analytics system 205 may automatically predict a post-event of an event (e.g., a current event) and determine a set of actions to perform with respect to the event.

In some implementations, analytics system 205 may generate a recommendation for an action based on the set of actions. For example, analytics system 205 may provide to user device 220 and/or client device 235 a message for display that indicates an action included in the set of actions.

As further shown in FIG. 5, process 500 may include performing an action related to the event (block 560). For example, analytics system 205 may perform an action included in a set of actions associated with a current event and/or another action.

In some implementations, analytics system 205 may identify an action to perform based on the order, the rank, and/or the priority of actions included in the set of actions that analytics system 205 has determined. For example, analytics system 205 may identify the action with the highest order, rank, and/or priority relative to other actions as the action to perform.

In some implementations, analytics system 205 may identify an action based on a combination of the order, rank, and/or priority of the action and a likelihood of a post-event included in the set of post-events. For example, analytics system 205 may identify a first action, associated with a first post-event, as having a higher priority than a second action, associated with a second post-event, but may select the second action when the second post-event has a higher likelihood than the first post-event, a likelihood that satisfies a threshold, and/or the like. This improves selection of an action to perform by permitting dynamic selection of the action based on a likelihood of a post-event associated with an event. In addition, this conserves processing resources that would otherwise be used to perform an action related to a low likelihood post-event or a post-event with a likelihood that does not satisfy a threshold.

In some implementations, analytics system 205 may modify the action based on an outcome of a post-event associated with a historical event. For example, analytics system 205 may determine an outcome for a post-event of a historical event (e.g., using data associated with the post-event and/or the historical event) and may modify an action included in the set of actions based on the outcome. Using a criminal event as an example, assume that analytics system 205 identifies deploying a particular quantity of police officers as the action to perform. Further assume that analytics system 205 determines that the same, or a similar, quantity of police officers were deployed during a similar historical event and that the suspect in the similar historical event evaded capture (e.g., by identifying a term and/or a tag, such as "suspect," "escaped," and/or "evaded capture" in a crime report for the crime event). In this case, analytics system 205 may modify the action to deploy a higher quantity of police officers based on determining that the suspect in the similar historical event evaded capture when the same, or a similar, quantity of police officers were deployed.

In some implementations, analytics system 205 may perform various actions regardless of whether the actions are associated with a post-event of a historical event. As an example of an action that analytics system 205 may perform, analytics system 205 may automatically transmit an SMS message to user devices 220 that are proximate to the location of the event. As another example, analytics system 205 may cause a law enforcement officer, or additional law enforcement officers, to be deployed to the location of the event by transmitting a message to user device 220 (e.g., used by a law enforcement officer) and/or to a dispatch system. As another example, analytics system 205 may cause emergency or medical personnel or equipment to be allocated and/or mobilized by transmitting a message to a dispatch system.

As another example, analytics system 205 may cause an emergency message to be broadcast by transmitting a command and/or a message to an emergency notification system. As another example, analytics system 205 may cause pedestrian traffic or vehicle traffic to be rerouted (e.g., by causing announcements to be made via a navigation system, a message to be displayed via an electronic sign, etc.). As another example, analytics system 205 may control traffic devices (e.g., a stop light or an electronic traffic sign), such as to detour or route vehicle and/or pedestrian traffic. As another example, analytics system 205 may cause evacuation or removal of personnel from an area (e.g., by causing an announcement to be made via an intercommunication system, a message to be displayed via an electronic sign, etc.).

As another example, analytics system 205 may cause a vehicle, such as an unmanned aerial vehicle (UAV), or a robot to be deployed to the location of the event (e.g., to gather additional media items and/or other data about an event). As another example, analytics system 205 may automatically complete a document, such as to request a warrant. In this way, analytics system 205 increases an efficiency of acting based on an event or a post-event related to the event, by reducing an amount of time from identification of the event or a post-event to performing an action.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein improve determination of a pre-event and/or prediction of a post-event associated with a current event and facilitate performing of an action based on the current event. In addition, implementations increase an efficiency of determining a pre-event and/or predicting a post-event by enabling automatic real-time or near real-time prediction. Further, implementations improve an accuracy of determining a pre-event and/or predicting a post-event, thereby conserving processing resources associated with inaccurately determining the pre-event and/or predicting the post-event. Further still, implementations improve safety by enabling quick and efficient performance of an action based on an event, such as a criminal event.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive data associated with a first event;
identify a first context of the first event based on the data;
identify a plurality of second events based on the first context and a second context of the plurality of second events,
the first context being semantically similar to the second context;
use a homophily technique to determine a score for the first event and the plurality of second events based on identifying the plurality of second events,
the score indicating a semantic similarity between the first event and a second event, of the plurality of second events, based on a knowledge graph,
the knowledge graph to store data from the first event and the plurality of second events in a plurality of nodes,
a node, of the plurality of nodes, including a geographic proximity of the first event and the plurality of second events,
the score being based on the plurality of nodes, and
the homophily technique being represented by:

$$S(E_i, E_j, KG) = \left(\frac{\text{total quantity of connected nodes}}{\text{total quantity of nodes in knowledge graph}}\right)$$

where S represents the score and indicates a similarity between the first event and each second event based on the knowledge graph, where Ei represents event i, which is the first event, Ej represents event j, which is each second event of the plurality of second events, KG represents a relationship between data in the knowledge graph for events i and j, total quantity of connected nodes represents a total quantity of nodes in the knowledge graph that data related to events i and j have in common, and events i and j are different events;
determine an order for the plurality of second events based on the score indicating a semantic similarity between the first event and each second event of the plurality of second events;
determine a set of pre-events associated with the first event based on a plurality of pre-events associated with the plurality of second events and based on the order for the plurality of second events,
one or more pre-events of the set of pre-events being similar to the plurality of pre-events;
identify a plurality of post-events associated with the plurality of second events based on identifying the plurality of second events in the knowledge graph;
identify another plurality of post-events associated with a plurality of third events based on identifying the plurality of third events in the knowledge graph,
a third context of the plurality of third events being similar to the first context, the first context, the second context, and the third context each including one or more of:
   information associated with a date of occurrence,
   information associated with a time of occurrence,
   information associated with a location of occurrence, or
   a device identifier of a device from which data associated with the first event was sent;
determine a set of post-events associated with the first event based on the set of pre-events and based on the plurality of post-events associated with the plurality of second events and the other plurality of post-events,
   the set of post-events including one or more post-events predicted to occur after the first event,
   the one or more post-events being similar to the plurality of post-events; and
perform an action related to the first event based on determining the set of post-events.

2. The device of claim 1, where the one or more processors are further to:
determine a timing of steps of the plurality of second events; and
where the one or more processors, when determining the set of pre-events, are to:
   determine the set of pre-events based on the timing of the steps of the plurality of second events.

3. The device of claim 1, where the one or more processors are to:
use a canonical correlation technique to identify the plurality of second events based on receiving the data;
apply a filter to the plurality of second events based on identifying the plurality of second events,
   the filter including a temporal filter or a geographic filter; and
where the one or more processors, when identifying the plurality of second events, are to:
   identify the plurality of second events based on applying the filter to the plurality of second events.

4. The device of claim 1, where the one or more processors are further to:
identify a second action associated with the plurality of second events based on identifying the plurality of second events;
determine a set of actions associated with the first event based on identifying the second action; and
where the one or more processors, when performing the action, are to:
   perform the action based on determining the set of actions,
   the action being included in the set of actions.

5. The device of claim 1, where the one or more processors are further to:
determine a severity level of the set of post-events; and
where the one or more processors, when performing the action, are to:
   perform the action based on the severity level of the set of post-events.

6. A method, comprising:
receiving, by a device, data associated with an event;
identifying, by the device, a context of the event based on receiving the data;
identifying, by the device, a similar event based on performing a comparison of the context of the event and a context of the similar event,
   each context including one or more of:
      information associated with a date of occurrence,
      information associated with a time of occurrence,
      information associated with a location of occurrence, or
      a device identifier of a device from which data associated with the event was sent;
using, by the device, a homophily technique to determine a score for the event and the similar event based on identifying the similar event,
   the score indicating a semantic similarity between the event and the similar event based on a knowledge graph,
      the knowledge graph to store data from the event and the similar event in a plurality of nodes,
         a node, of the plurality of nodes, including a geographic proximity of the event and the similar event,
      the score being based on the plurality of nodes, and
   the homophily technique being represented by:

$$S(E_i, E_j, KG) = \left(\frac{\text{total quantity of connected nodes}}{\text{total quantity of nodes in knowledge graph}}\right)$$

where S represents the score and indicates a similarity between the event and the similar event, where Ei represents event i, which is the event, Ej represents event j, which is the similar event, KG represents a relationship between data in the knowledge graph for events i and j, total quantity of connected nodes represents a total quantity of nodes in the knowledge graph that data related to events i and j have in common, and events i and j are different events;
determining, by the device, a set of pre-events associated with the event based on identifying a pre-event that occurred before the similar event and based on the score of the event and the similar event,
   the set of pre-events including at least one pre-event similar to the pre-event that occurred before the similar event;
identifying, by the device, another similar event based on receiving other data associated with the other similar event;
determining, by the device, whether the other similar event is a post-event associated with the similar event based on identifying the other similar event;
determining, by the device, a set of post-events associated with the event based on determining the set of pre-events and identifying a post-event that occurred after the similar event and based on determining whether the other similar event is the post-event associated with the similar event,
   the set of post-events including at least one post-event similar to the post-event; and
performing, by the device, an action based on the set of post-events.

7. The method of claim 6, further comprising:
receiving other data associated with the similar event prior to receiving the data;
identifying the pre-event, the post-event, or the context of the similar event based on receiving the other data; and
storing information identifying the pre-event, the post-event, or the context of the similar event based on identifying the pre-event, the post-event, or the context of the similar event.

8. The method of claim 6, further comprising:
processing the data to identify a term included in the data based on receiving the data; and
where identifying the context of the event comprises:
   identifying the context of the event based on processing the data to identify the term.

9. The method of claim 8, further comprising:
identifying a first term included in the data based on receiving the data,
   the first term being associated with the context of the event;
identifying a second term included in other data based on receiving the other data,
   the second term being associated with the context of the similar event;
determining whether the first term and the second term are similar based on identifying the first term and the second term; and
where identifying the similar event comprises:
   identifying the similar event based on determining whether the first term and the second term are similar.

10. The method of claim 6, further comprising:
identifying one or more pre-events associated with one or more semantically similar events based on identifying the one or more semantically similar events,
   the one or more semantically similar events including the similar event;
determining whether the one or more pre-events are associated with a threshold quantity of the one or more semantically similar events based on identifying the one or more pre-events; and
where determining the set of pre-events comprises:
   determining the set of pre-events based on determining whether the one or more pre-events are associated with the threshold quantity of the one or more semantically similar events.

11. The method of claim 6, further comprising:
determining the action to perform based on a similar action associated with the post-event;
determining an outcome of the post-event using a term associated with the post-event based on determining the action;
modifying the action based on determining the outcome of the post-event; and
where performing the action comprises:
   performing the action based on modifying the action.

12. A non-transitory computer-readable medium storing instructions, the instructions comprising:
one or more instructions that, when executed by one or more processors, cause the one or more processors to:
   receive, from multiple devices, data associated with an event;
   process the data to identify a context of the event,
      the context of the event being based on a term or a tag identified in the data;
   identify a historical event associated with a similar context as the context of the event based on processing the data,
      the context of the historical event being based on another term semantically similar to the term or another tag similar to the tag,
      each context including one or more of:
         information associated with a date of occurrence,
         information associated with a time of occurrence,
         information associated with a location of occurrence, or
         a device identifier of a device from which data associated with the event was sent;
   use a homophily technique to determine a score for the event and the historical event based on identifying the historical event,
      the score indicating a semantic similarity between the event and the historical event based on a knowledge graph,
         the knowledge graph to store data from the event and the historical event in a plurality of nodes,
            a node, of the plurality of nodes, including a geographic proximity of the event and the historical event, and
         the score being based on the plurality of nodes, and
      the homophily technique being represented by:

$$S(E_i, E_j, KG) = \left(\frac{\text{total quantity of connected nodes}}{\text{total quantity of nodes in knowledge graph}}\right)$$

where S represents the score and indicates a similarity between the event and the historical event based on the knowledge graph, where Ei represents event i, which is the event, Ej represents event j, which is the historical event, KG represents a relationship between data in the knowledge graph for events i and j, total quantity of connected nodes represents a total quantity of nodes in the knowledge graph that data related to events i and j have in common, and events i and j are different events,
   determine a set of pre-events associated with the event based on identifying a pre-event associated with the historical event and based on the score of the event and the historical event,
      the set of pre-events being semantically similar to the pre-event;
   identify a post-event associated with the historical event;
   identify another post-event associated with the historical event,
   determine a set of post-events associated with the event based on the set of pre-events and based on the post-event associated with the historical event and the other post-event,
      the set of post-events being semantically similar to the post-event; and
   perform an action related to the event based on determining the set of post-events.

13. The non-transitory computer-readable medium of claim 12, where the one or more instructions, when executed by the one or more processors, further cause the one or more processors to:
identify a first pre-event associated with a first historical event and a second pre-event associated with a second historical event based on identifying the first historical event and the second historical event;
normalize a first temporal distance of the first pre-event from the first historical event and a second temporal distance of the second pre-event from the second historical event; and
where the one or more instructions, that cause the one or more processors to determine the set of pre-events, cause the one or more processors to:

determine the set of pre-events based on normalizing the first temporal distance and the second temporal distance.

14. The non-transitory computer-readable medium of claim 12, where the one or more instructions, when executed by the one or more processors, further cause the one or more processors to:
    determine a likelihood of the set of post-events based on determining the set of post-events;
    determine a set of actions to perform based on the likelihood of the set of post-events,
        the set of actions including the action; and
    where the one or more instructions, that cause the one or more processors to perform the action, cause the one or more processors to:
        perform the action based on determining the set of actions.

15. The non-transitory computer-readable medium of claim 12, where the one or more instructions, when executed by the one or more processors, further cause the one or more processors to:
    determine a set of actions based on the set of post-events, the set of actions including the action;
    determine a likelihood of a historical action, similar to the action, being associated with one or more historical events using a Bayesian probability technique based on determining the set of actions; and
    where the one or more instructions, that cause the one or more processors to perform the action, cause the one or more processors to:
        perform the action based on the likelihood satisfying a threshold.

16. The non-transitory computer-readable medium of claim 12, where the one or more instructions, when executed by the one or more processors, further cause the one or more processors to:
    use a predictive modeling technique to predict the set of post-events based on the post-event; and
    where the one or more instructions, that cause the one or more processors to determine the set of post-events, cause the one or more processors to:
        determine the set of post-events based on using the predictive modeling technique to predict the set of post-events.

17. The non-transitory computer-readable medium of claim 12, where the one or more instructions, when executed by the one or more processors, further cause the one or more processors to:
    identify first pre-events associated with the historical event and second pre-events associated with the historical event,
        the first pre-events being associated with a first set of semantically similar terms,
        the second pre-events being associated with a second set of semantically similar terms;
    determine a first group of pre-events for the first pre-events and a second group of pre-events for the second pre-events based on identifying the first pre-events and the second pre-events; and
    where the one or more instructions, that cause the one or more processors to determine the set of pre-events, cause the one or more processors to:
        determine the set of pre-events based on the first group of pre-events and the second group of pre-events.

18. The device of claim 1, where the one or more processors are further to:
    identify a pre-event by matching an object identified in an image related to pre-events associated with a threshold quantity of percentage of the plurality of second events; and
    where the one or more processors, when determining the set of pre-events, are to:
        determine the set of pre-events associated with the first event based identifying the pre-event.

19. The device of claim 1, where the one or more processors are further to:
    determine the action to perform based on a similar action associated with a post-event from the plurality of post-events;
    determine an outcome of the post-event using a term associated with the post-event based on determining the action; and
    modify the action based on determining the outcome of the post-event; and
    where the one or more processors, when performing the action, are to:
        perform the action based on modifying the action.

20. The method of claim 6, further comprising:
    identifying another pre-event by matching an object identified in an image related to pre-events associated with a threshold quantity of percentage of the similar event; and
    where determining the set of pre-events comprises:
        determining the set of pre-events associated with the event based identifying the other pre-event.

* * * * *